US012549677B2

(12) United States Patent
Nicastri et al.

(10) Patent No.: US 12,549,677 B2
(45) Date of Patent: Feb. 10, 2026

(54) APPARATUSES, COMPUTER PROGRAM PRODUCTS, AND COMPUTER-IMPLEMENTED METHODS FOR HARDWARE-ACCELERATED VIDEO STREAM SYNTHESIZING

(71) Applicant: Honeywell International Inc., Charlotte, NC (US)

(72) Inventors: James Nicastri, Wentworth Point (AU); Mark Flannery, Turramurra (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 167 days.

(21) Appl. No.: 18/184,244

(22) Filed: Mar. 15, 2023

(65) Prior Publication Data

US 2023/0412753 A1    Dec. 21, 2023

Related U.S. Application Data

(60) Provisional application No. 63/366,435, filed on Jun. 15, 2022.

(51) Int. Cl.
*H04N 5/262* (2006.01)
*H04N 7/01* (2006.01)
*H04N 21/2365* (2011.01)

(52) U.S. Cl.
CPC ......... *H04N 5/2624* (2013.01); *H04N 7/0127* (2013.01); *H04N 21/2365* (2013.01)

(58) Field of Classification Search
CPC .............. H04N 5/2624; H04N 7/0127; H04N 21/2365; H04N 21/2343; H04N 21/2665;
(Continued)

(56) References Cited

U.S. PATENT DOCUMENTS 6,636,269 B1 * 10/2003 Baldwin ................ G09G 5/393
348/E5.009
9,858,029 B2    1/2018 Kim
(Continued)

FOREIGN PATENT DOCUMENTS

CN        108881918 A      11/2018

OTHER PUBLICATIONS

AU Office Action Mailed on Jul. 6, 2024 for AU Application No. 2023203276, 3 page(s).
(Continued)

*Primary Examiner* — Chenea Davis
(74) *Attorney, Agent, or Firm* — ALSTON & BIRD LLP

(57) ABSTRACT

Embodiments of the present disclosure efficiently create a single video stream from a plurality of individual video streams. The single video stream may embody a grid-based presentation of the individual video streams, without requiring separate objects for each stream. Such embodiments utilize particular hardware-accelerated multiplexing image pipelines executed via one or more graphics processing unit for efficient processing. Embodiments include a multiplexer component configured to perform the hardware-accelerated image pipelines executed on one or more GPUs. Some such embodiments output a common output video that may be outputted for a variety of use cases, including but without limitation outputting to a display wall, outputting to one or more web-based client devices, outputting locally to a client device, and outputting locally to a multimonitor display. Some embodiments generate utilize an image primitive frame that is sharable between multiplexers for use in different use cases without need to repeat processing steps.

19 Claims, 14 Drawing Sheets

(58) Field of Classification Search
CPC .. H04N 21/431; H04N 21/4347; G06F 3/147; G06F 3/1446; G09G 5/001; G09G 5/363; G09G 2352/00; G09G 2360/06; G09G 2360/08; G09G 2360/122; G09G 2370/20
See application file for complete search history.

(56) References Cited

U.S. PATENT DOCUMENTS

| | | | |
|---|---|---|---|
| 10,613,811 B2 | 4/2020 | Hardacker et al. | |
| 2005/0097620 A1* | 5/2005 | Fye | H04N 5/45 725/100 |
| 2008/0316295 A1* | 12/2008 | King | H04N 7/152 348/14.09 |
| 2009/0067507 A1 | 3/2009 | Baird et al. | |
| 2016/0275905 A1* | 9/2016 | Sacchetto | G09G 5/006 |
| 2019/0222623 A1* | 7/2019 | Huang | H04N 19/172 |
| 2020/0169767 A1* | 5/2020 | Tandon | H04N 21/2387 |
| 2021/0212168 A1 | 7/2021 | Yoden | |
| 2021/0263697 A1 | 8/2021 | Mattson et al. | |

OTHER PUBLICATIONS

Userful Corporation, "Userful," 5 pgs., 2023. [Retrieved from the Internet May 23, 2023: <URL: https://www.userful.com/>].

Vuwall Technology, "VuWall. VuStream Encoders & Multi-View Decoders" 11 pgs., 2023. [Retrieved from the Internet May 23, 2023: <URL: https://vuwall.com/wp-content/uploads/VuWall_VuStream_Datasheet.pdf/>].

European search report Mailed on Aug. 1, 2023 for EP Application No. 23177175, 8 page(s).

AU Office Action Mailed on Feb. 22, 2024 for AU Application No. 2023203276, 3 page(s).

EP Office Action Mailed on May 15, 2025 for EP Application No. 23177175, 7 page(s).

* cited by examiner

APPARATUSES, COMPUTER PROGRAM PRODUCTS, AND COMPUTER-IMPLEMENTED METHODS FOR HARDWARE-ACCELERATED VIDEO STREAM SYNTHESIZING

CROSS REFERENCE TO RELATED APPLICATIONS

This application claims the benefit of U.S. Provisional Patent App. No. 63/366,435, filed Jun. 15, 2022, the contents of which are incorporated by reference herein in their entireties.

TECHNOLOGICAL FIELD

Embodiments of the present disclosure generally relate outputting a plurality of video streams simultaneously, and specifically to synthesizing a plurality of video streams into a single video output.

BACKGROUND

Often a plurality of video streams are to be viewed simultaneously for any of a myriad of reasons. The number of video streams can range from a few independent video streams to tens, hundreds, or even thousands of simultaneously video streams. Applicant has discovered problems with current implementations for simultaneously viewing independent video streams. Through applied effort, ingenuity, and innovation, Applicant has solved many of these identified problems by developing embodied in the present disclosure, which are described in detail below.

BRIEF SUMMARY

In general, embodiments of the present disclosure provided herein provide for improved processing and synchronization of a plurality of independent video streams into a single, common video using hardware-accelerated image processing. Other implementations for outputting a common output video will be, or will become, apparent to one with skill in the art upon examination of the following figures and detailed description. It is intended that all such additional implementations be included within this description be within the scope of the disclosure, and be protected by the following claims.

In a first aspect of the disclosure, an apparatus for hardware-accelerated video multiplexing is provided. In one example embodiment the apparatus includes at least one graphics processing unit, at least one processor, and at least one non-transitory memory. The at least one non-transitory memory includes computer-coded instructions thereon that, with the at least one processor, cause the apparatus to receive a plurality of input video streams from a plurality of video input sources. The apparatus is further caused to process each input video stream of the plurality of input video streams via the at least one graphics processing unit. Each input video stream associated with a particular multiplexing image pipeline of a plurality of multiplexing image pipelines. Each multiplexing image pipeline is configured to parse a frame from the particular input video stream. Each multiplexing image pipeline is further configured to copy the frame to the at least one graphics processing unit. Each multiplexing image pipeline is further configured to process, via a multiplexing image pipeline executed by the at least one graphics processing unit, the frame to generate a processed frame. Each multiplexing image pipeline is further configured to output, via the at least one graphics processing unit and the multiplexing image pipeline, the processed frame to a portion of an output frame, the portion of the output frame corresponding to the particular input video stream. The apparatus is further caused to output, via the at least one graphics processing unit, the output frame to a common output video.

In some embodiments of the example apparatus, to output each output frame to a single output video, the apparatus is configured to write, via the at least one graphics processing unit, the output frame to a file comprising the common output video.

In some embodiments of the example apparatus, to output each output frame to a single output video, the apparatus is configured to generate, via the at least one graphics processing unit, a packet comprising the common output video.

In some embodiments of the example apparatus, the output frame comprises a grid comprising a plurality of rows and a plurality of columns, where the portion of the output frame corresponding to the particular input video stream comprises a defined range of rows and columns in the grid.

In some embodiments of the example apparatus, the at least one graphics processing unit further caused to receive output configuration data comprising first data representing a plurality of URIs corresponding to the plurality of input video streams selected from a plurality of candidate input streams, second data representing an output frame rate of the common output video, third data representing an output resolution of the common output video, and/or fourth data representing a configuration of the common output video.

In some embodiments of the example apparatus, the at least one graphics processing unit further caused to retrieve output configuration data comprising first data representing a plurality of URIs corresponding to the plurality of input video streams selected from a plurality of candidate input streams, second data representing an output frame rate of the common output video, third data representing an output resolution of the common output video, and/or fourth data representing a configuration of the common output video.

In some embodiments of the example apparatus, the multiplexing image pipeline comprises an input pipeline configured to generate decoded frame data by decoding the frame based at least in part on an input encoding corresponding to the particular input video stream, generate resized frame data by resizing the decoded frame data to an output frame size corresponding to the particular input video stream, generate reformatted frame data by reformatting the resized frame data to a base format, and copy the reformatted frame data to the portion of the output frame in an output buffer. In some such embodiments of the example apparatus, the base format comprises an RGBa format. Alternatively or additionally, in some such embodiments of the example apparatus, the multiplexing image pipeline comprises an output pipeline configured to copy the output buffer to an encoder, and generate the output frame by encoding the output buffer via the encoder.

In some embodiments of the example apparatus, the apparatus is further caused to output the common output video to a plurality of client devices.

In some embodiments of the example apparatus, the processed frame comprises an image primitive, the apparatus further caused to receive an indication of a selected output type; and output the common output video based at least in part on the selected output type.

In some embodiments of the example apparatus, the apparatus further caused to receive an inputs modification request to remove a selected input stream from the plurality of input video streams, replace the selected stream from the plurality of input video streams with a replacement input stream, or add a new input stream to the plurality of input video streams; and alter the plurality of input video streams based at least in accordance with the inputs modification request.

In some embodiments of the example apparatus, at least a first multiplexing image pipeline of the multiplexing image pipelines is associated with a first framerate and a second multiplexing image pipeline of the multiplexing image pipelines is associated with a second framerate, and to output the output frame the apparatus is caused to synchronize a plurality of portions of the output frame based at least in part on a synchronization frame rate.

In some embodiments of the example apparatus, encode the common video output to a target video format.

In some embodiments of the example apparatus, the output frame comprises compressed image data, raw image data, or packetized image data.

In some embodiments of the example apparatus, the apparatus further caused to decompress each input video stream of the plurality of video streams before processing.

In some embodiments of the example apparatus, each particular multiplexing image pipeline comprises an input pipeline that generates the processed frame comprising an image primitive frame and an output pipeline that outputs the processed frame.

In some embodiments of the example apparatus, the apparatus further caused to transmit the common output video to a client device utilizing a standardized streaming format.

In some embodiments of the example apparatus, the apparatus further caused to receive at least one data-driven alert associated with the plurality of input video streams; and identify the plurality of input video streams based at least in part on the at least one data-driven alert.

In another aspect of the disclosure, for improved processing and synchronization of a plurality of independent video streams into a single, common video using hardware-accelerated image processing is provided. In one example embodiment the computer-implemented method includes receiving, at a system comprising at least one graphics processing unit, a plurality of input video streams from a plurality of video input sources. The example computer-implemented method further includes processing each input video stream of the plurality of input video streams via the at least one graphics processing unit, each input video stream processed using a particular multiplexing image pipeline of a plurality of multiplexing image pipelines, where processing each particular input video stream via the particular multiplexing image pipeline includes parsing, via the at least one graphics processing unit, a frame from the particular input video stream, copying, via the at least one graphics processing unit, the frame to the at least one graphics processing unit, processing, via the at least one graphics processing unit, the frame to generate a processed frame, and outputting, via the at least one graphics processing unit, the processed frame to a portion of an output frame, the portion of the output frame corresponding to the particular input video stream. The example computer-implemented method further includes outputting, via the at least one graphics processing unit, the output frame to a common output video.

In another aspect of the disclosure, a computer program product for improved processing and synchronization of a plurality of independent video streams into a single, common video using hardware-accelerated image processing is provided. The computer program product includes at least one non-transitory computer-readable storage medium having computer program code stored thereon. The computer program code, in execution with at least one processor, configures the at least one processor for receiving a plurality of input video streams from a plurality of video input sources. The example computer program product is further configured for processing each input video stream of the plurality of input video streams via at least one graphics processing unit, each input video stream processed using a particular multiplexing image pipeline of a plurality of multiplexing image pipelines. Processing each particular input video stream via the particular multiplexing image pipeline includes parsing, via the at least one graphics processing unit, a frame from the particular input video stream, copying, via the at least one graphics processing unit, the frame to the at least one graphics processing unit, processing, via the at least one graphics processing unit, the frame to generate a processed frame, and outputting, via the at least one graphics processing unit, the processed frame to a portion of an output frame, the portion of the output frame corresponding to the particular input video stream. The computer program product is further configured for outputting, via the at least one graphics processing unit, the output frame to a common output video.

BRIEF DESCRIPTION OF THE DRAWINGS

Figure 1A:
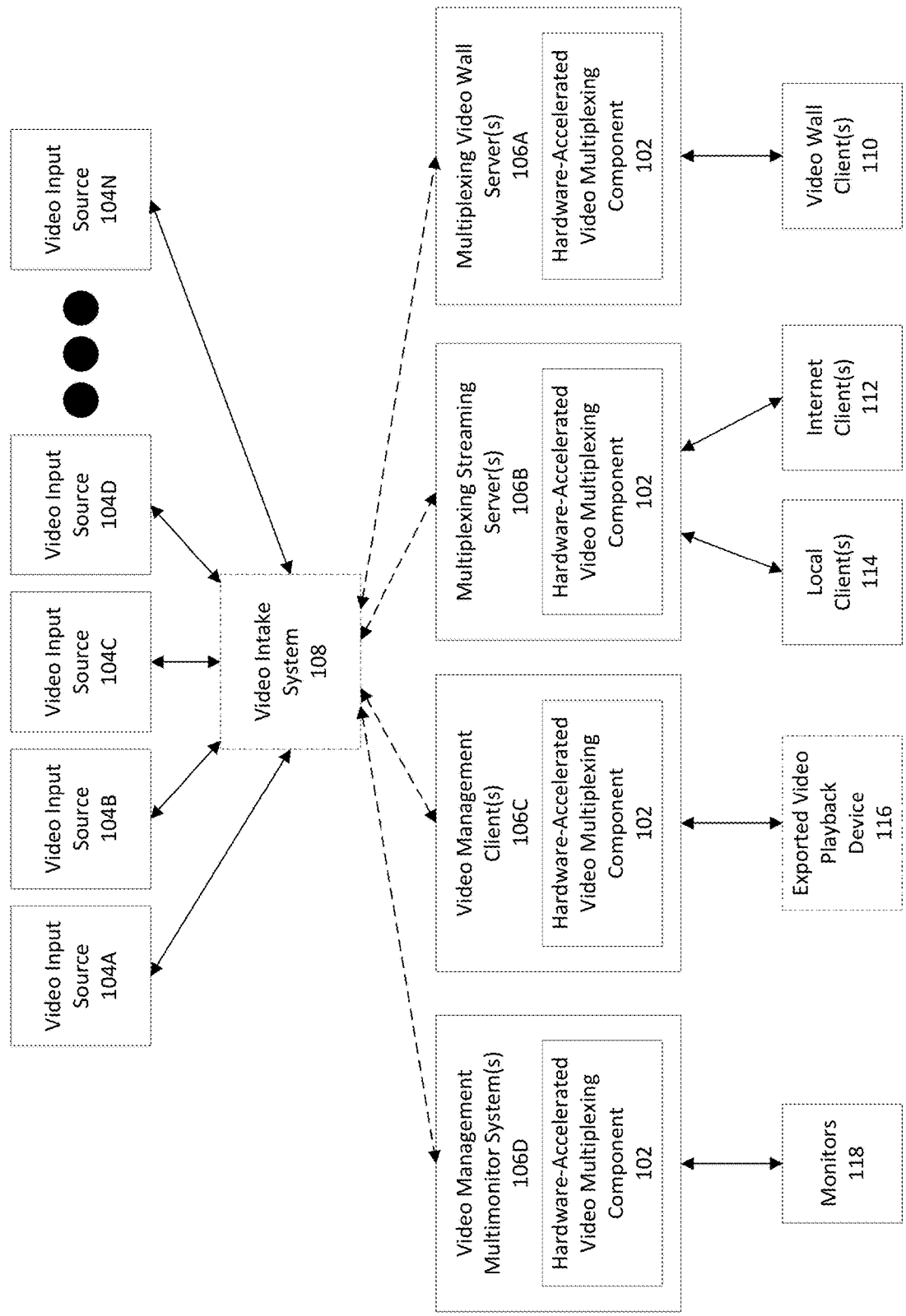
Figure 1B:
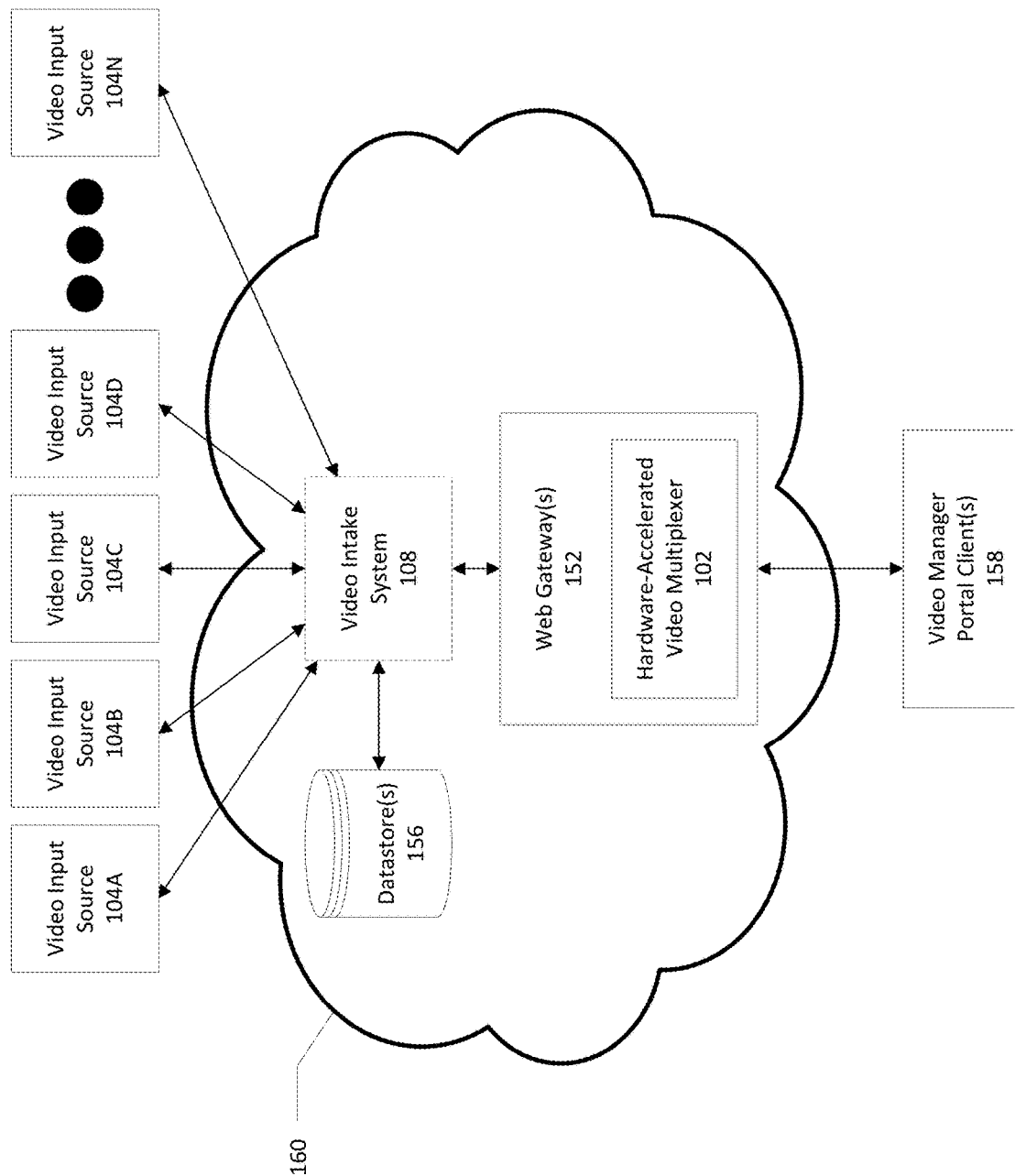
Figure 2:
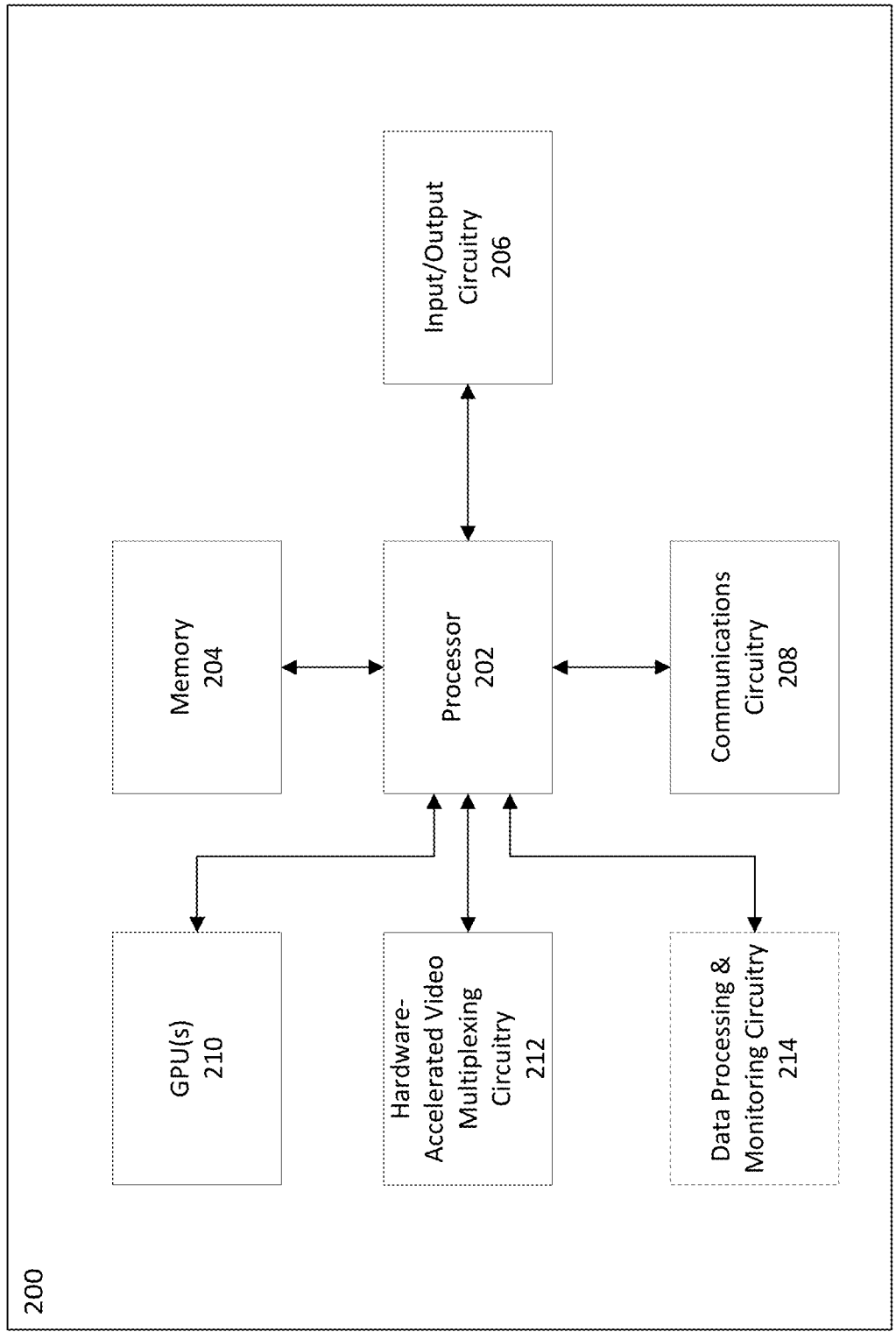
Figure 3:
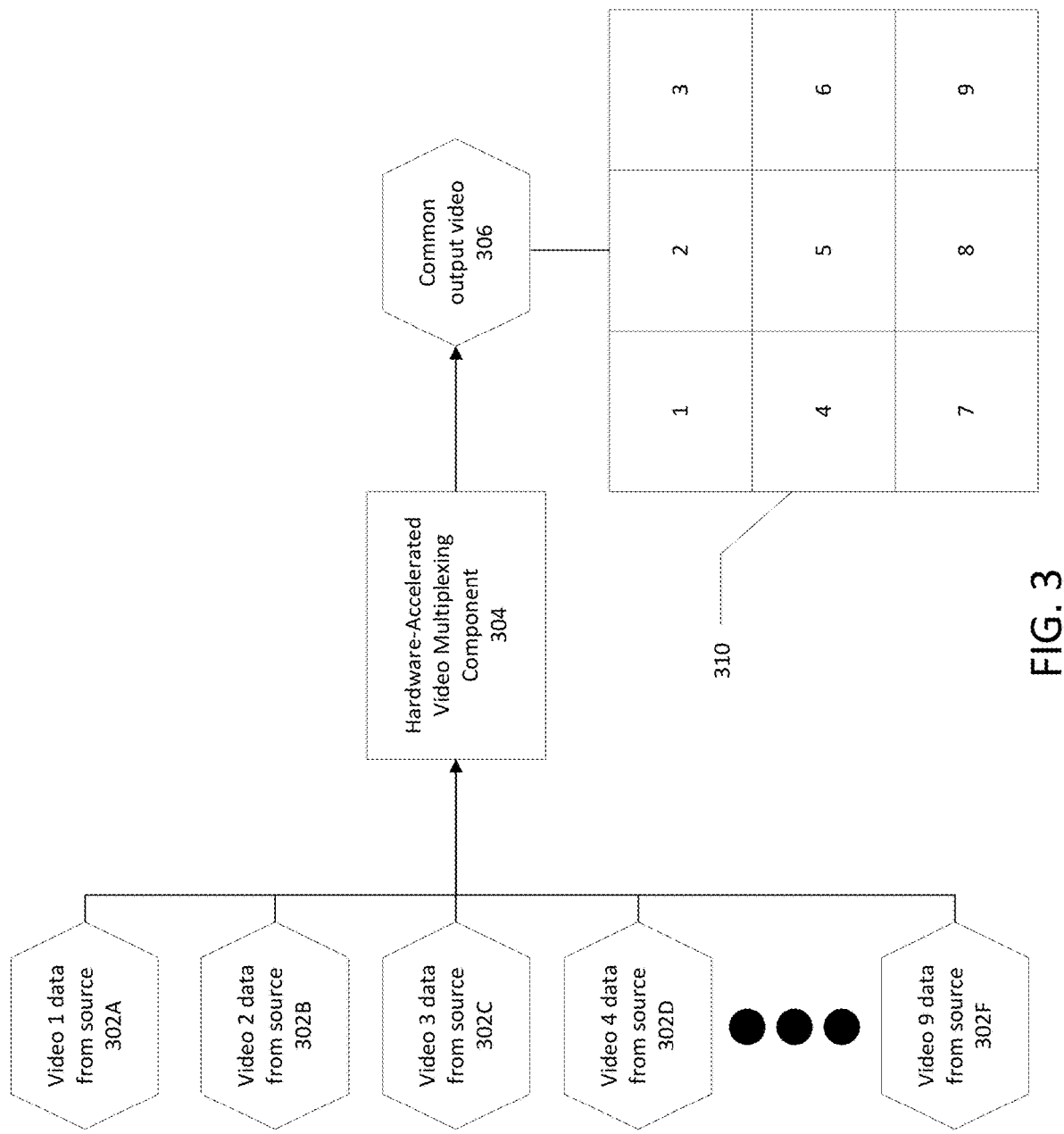
Figure 4:
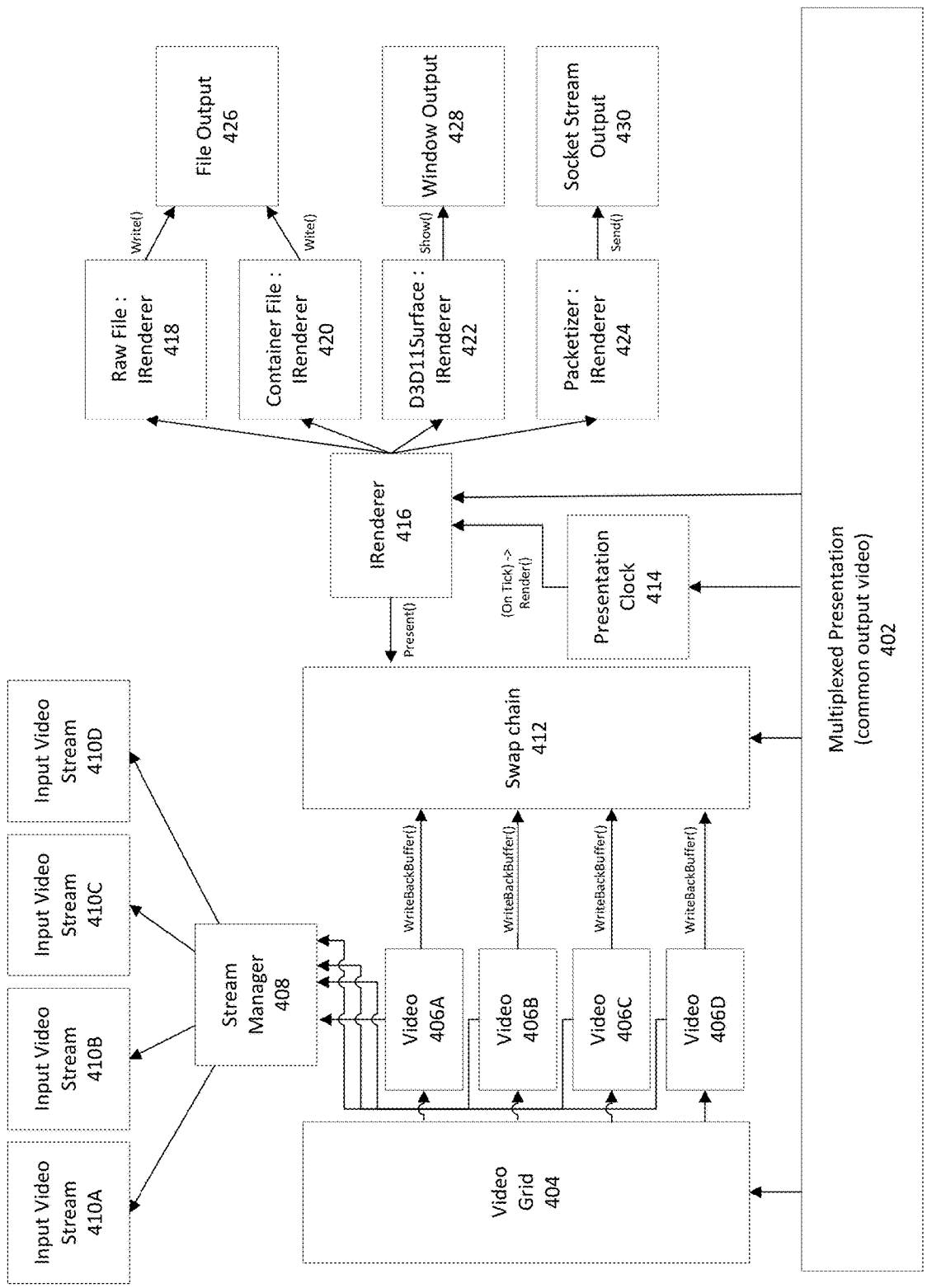
Figure 5:
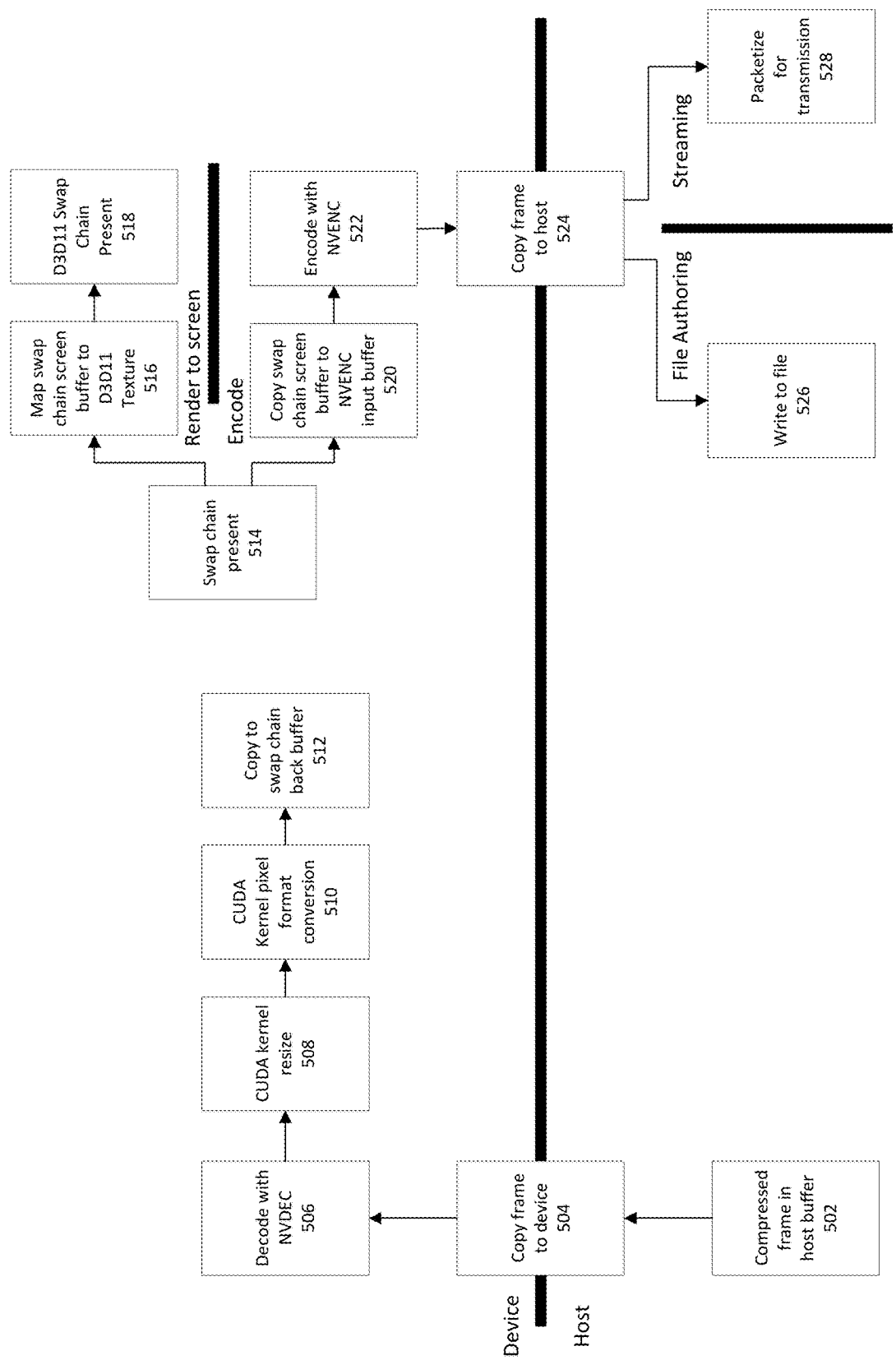
Figure 6:
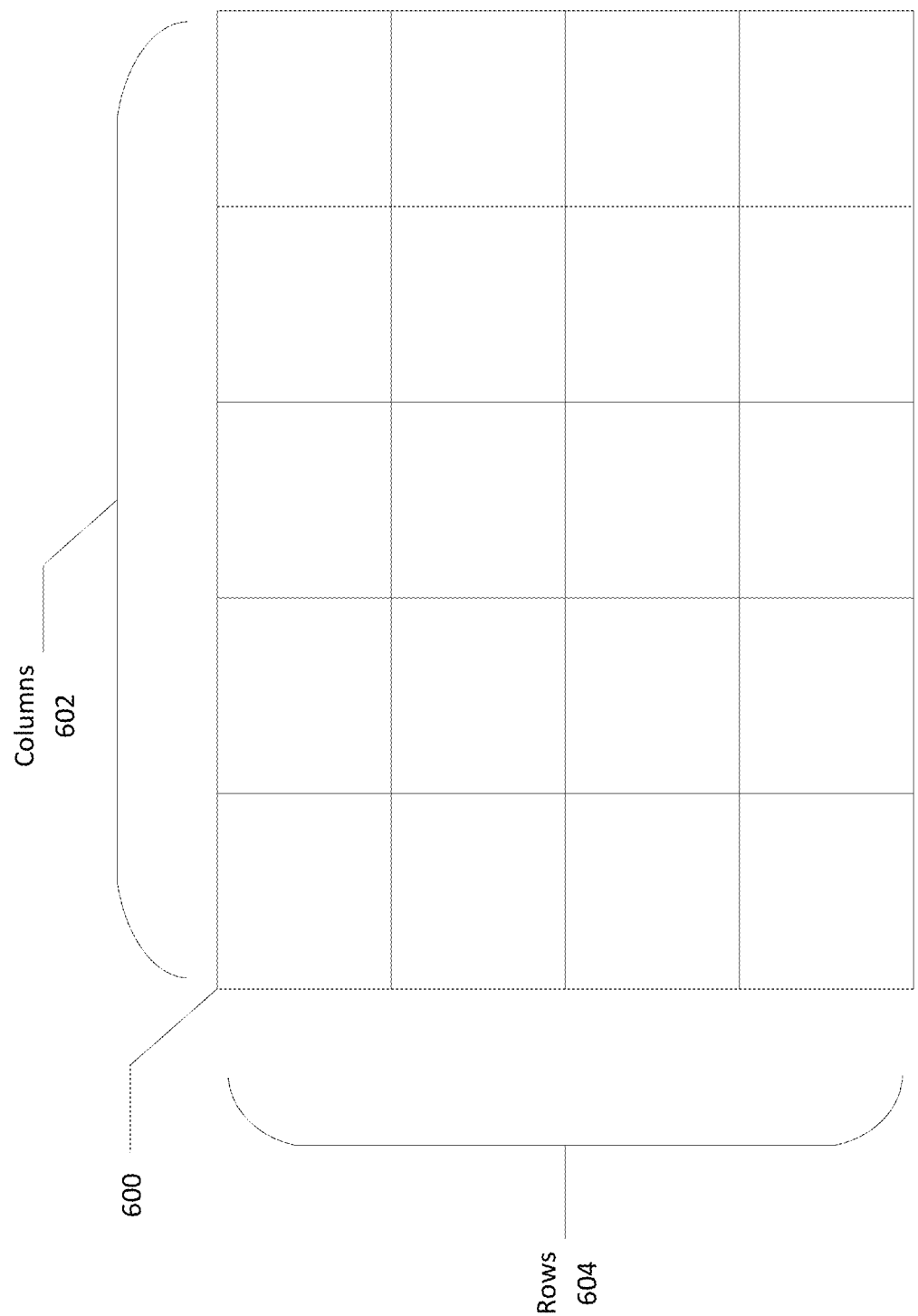
Figure 7:
Figure 8:
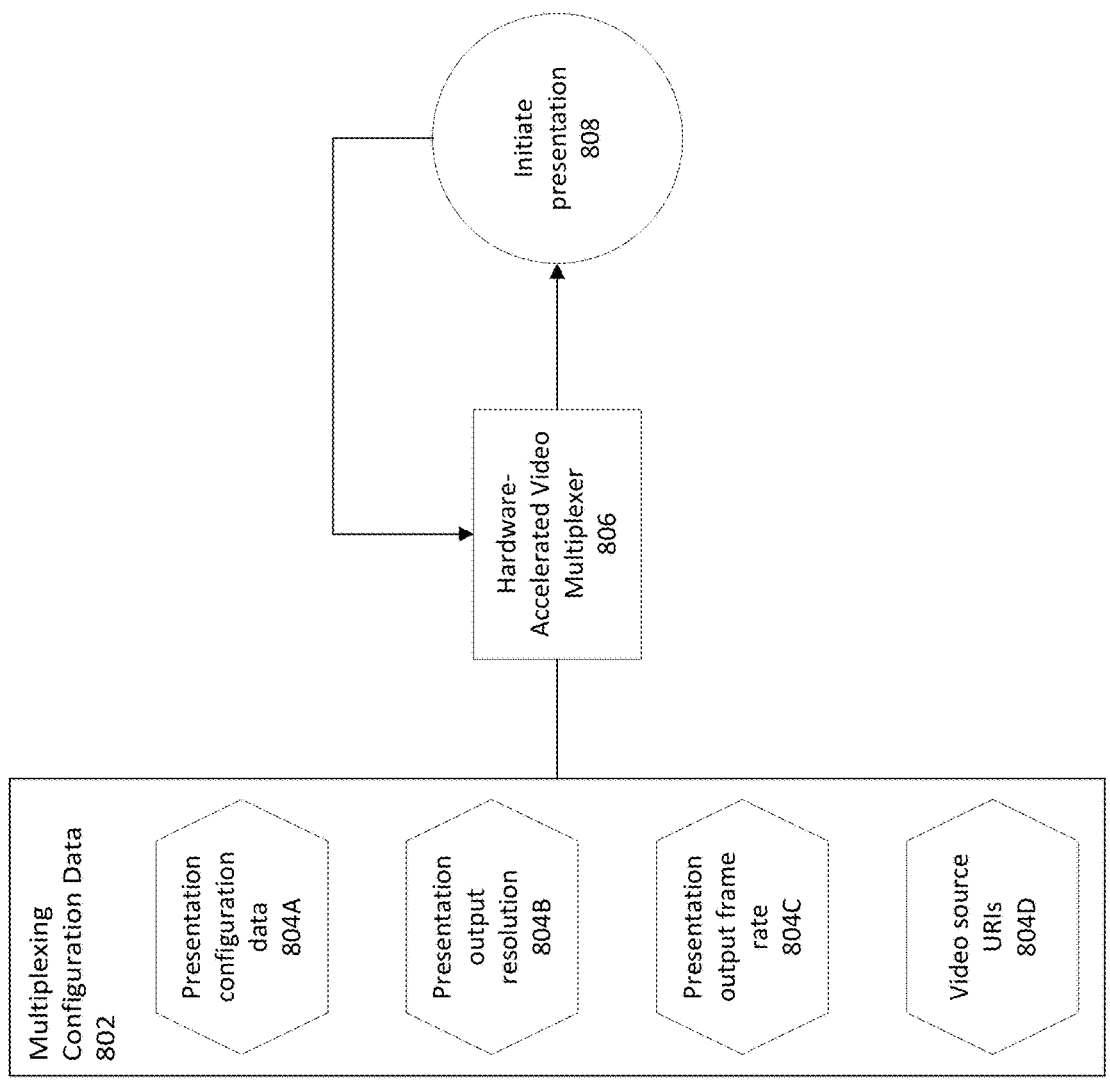
Figure 9:
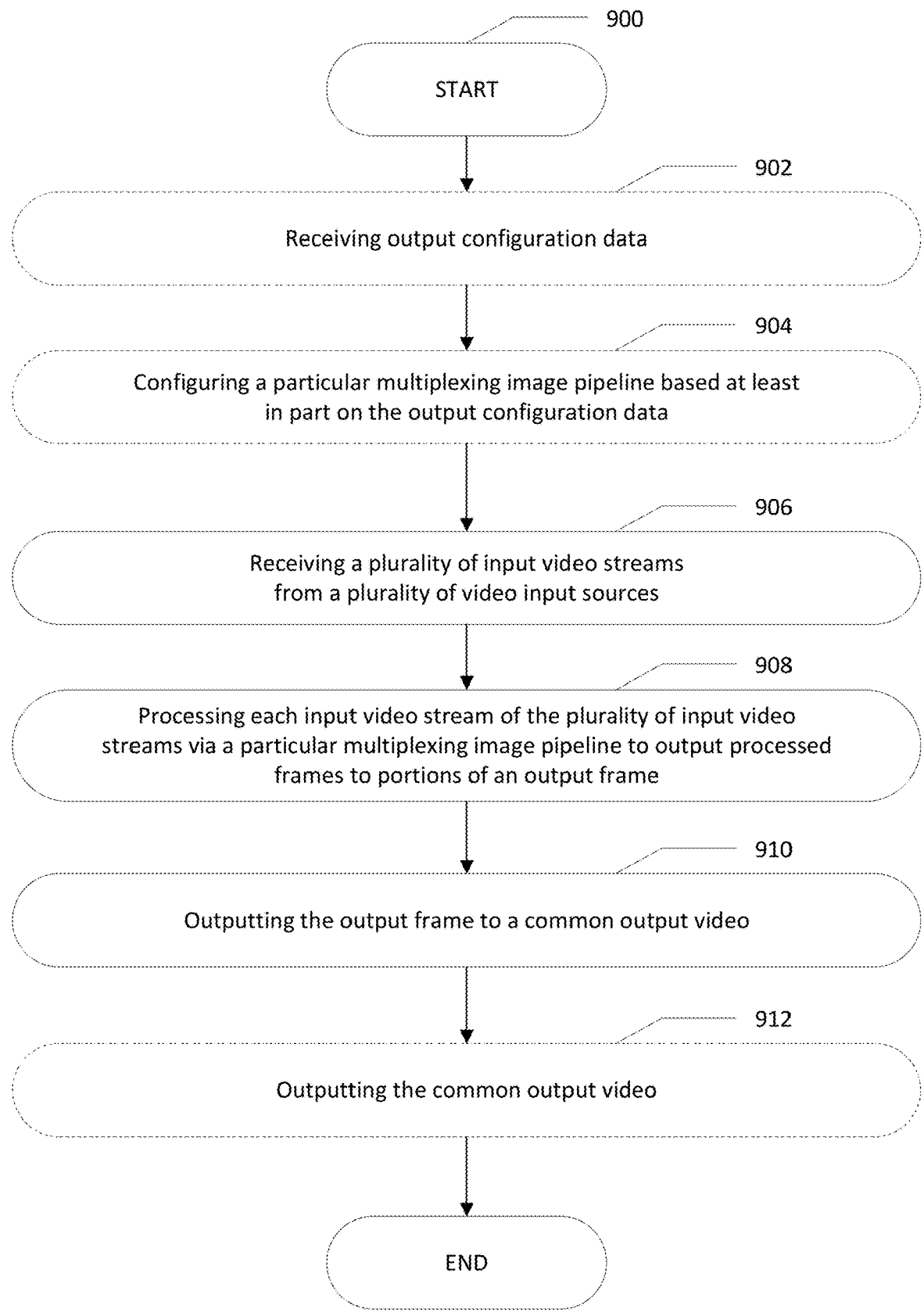
Figure 10:
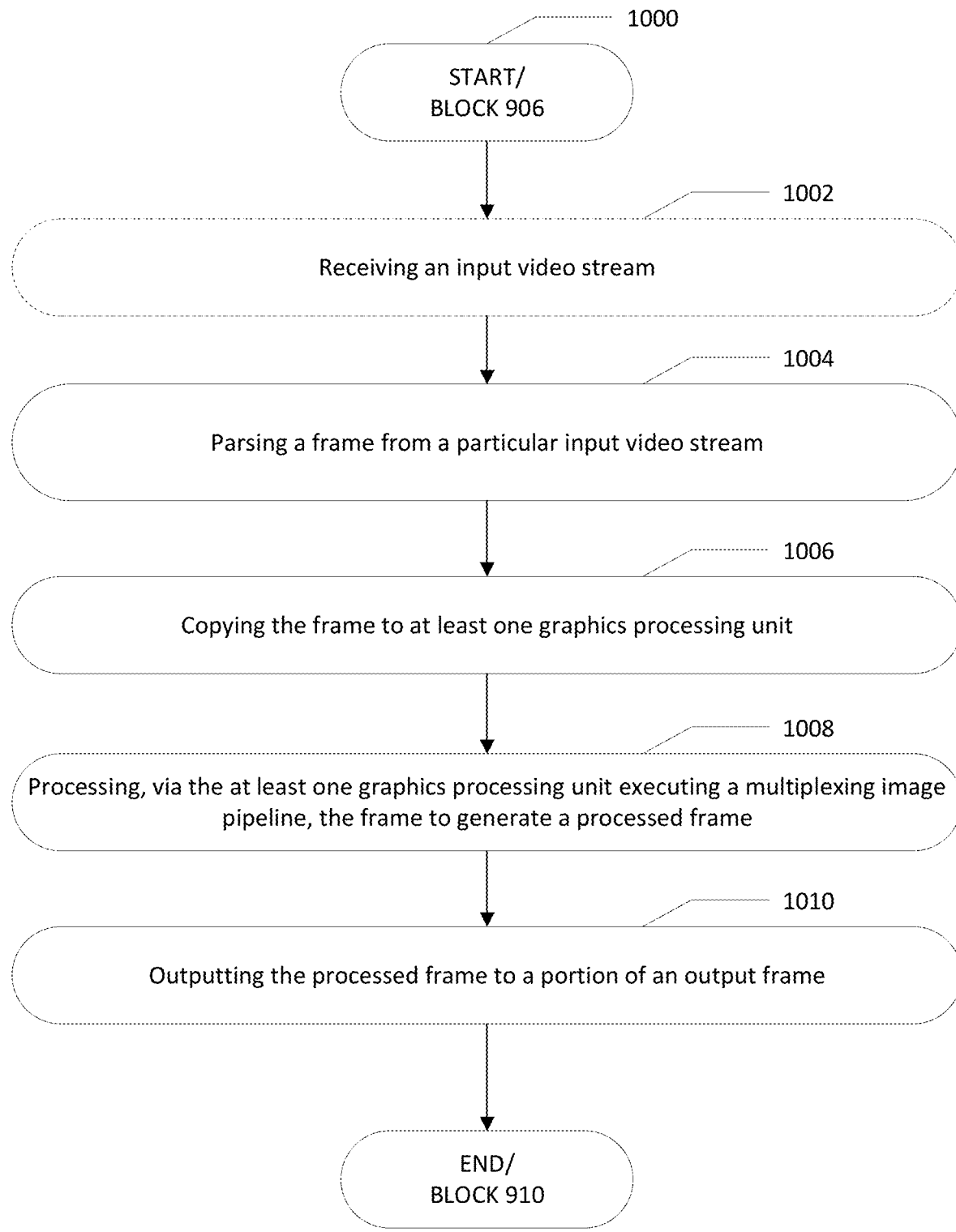
Figure 11:
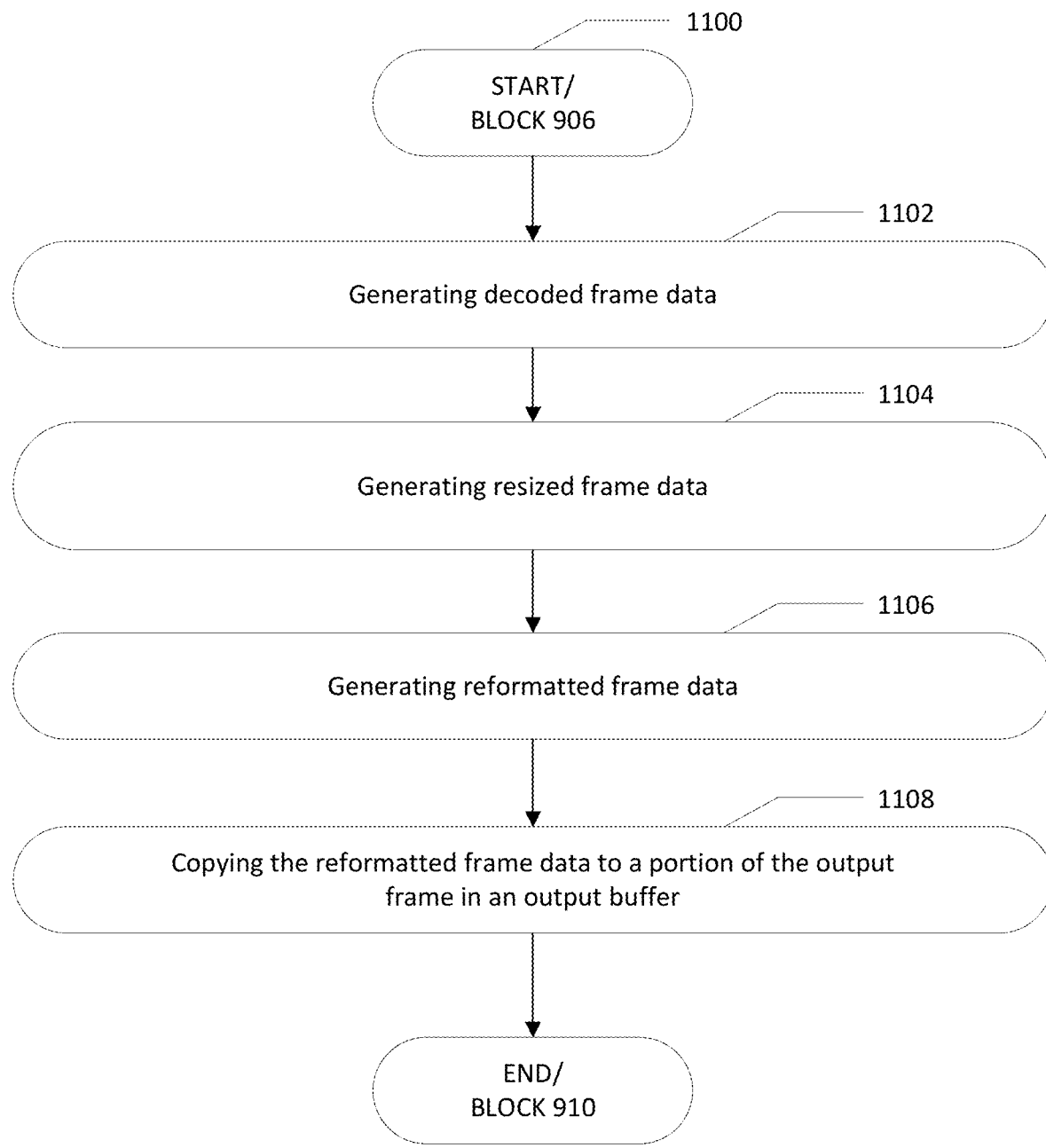
Figure 12:
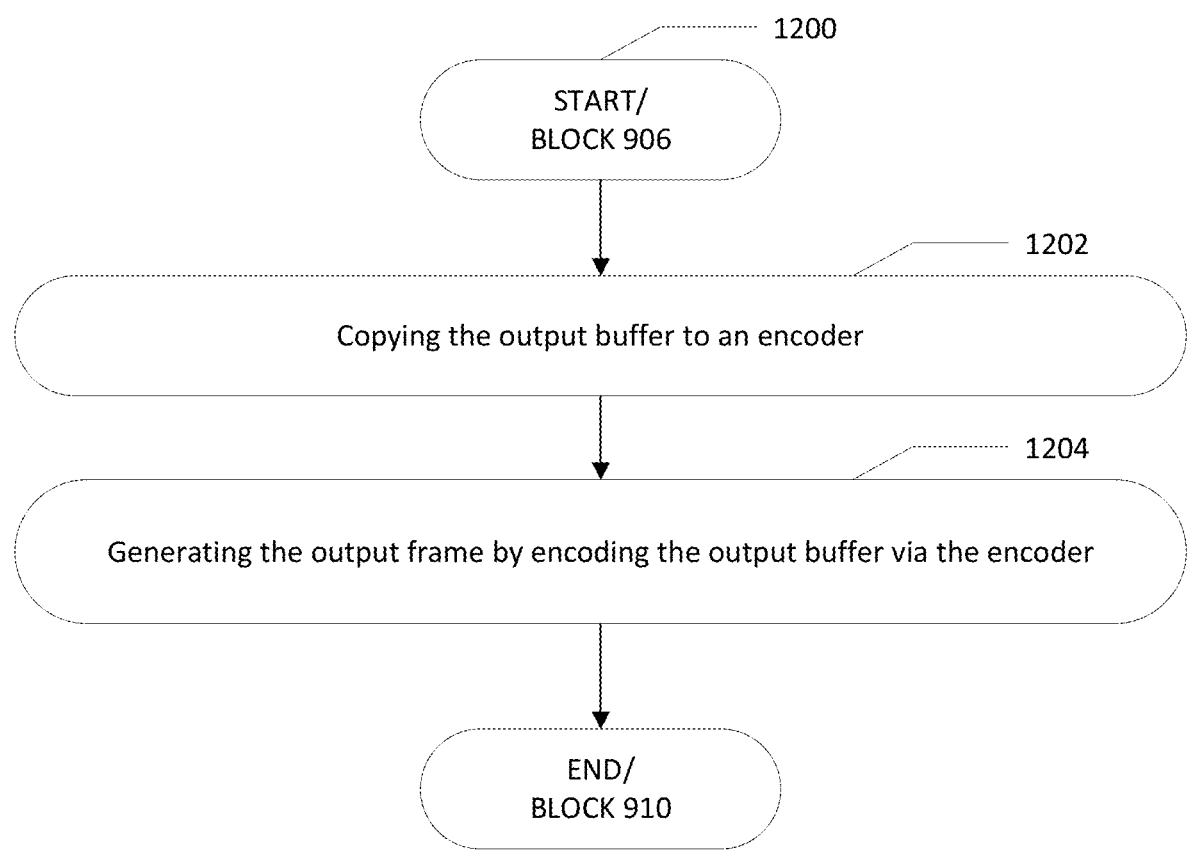
Figure 13:
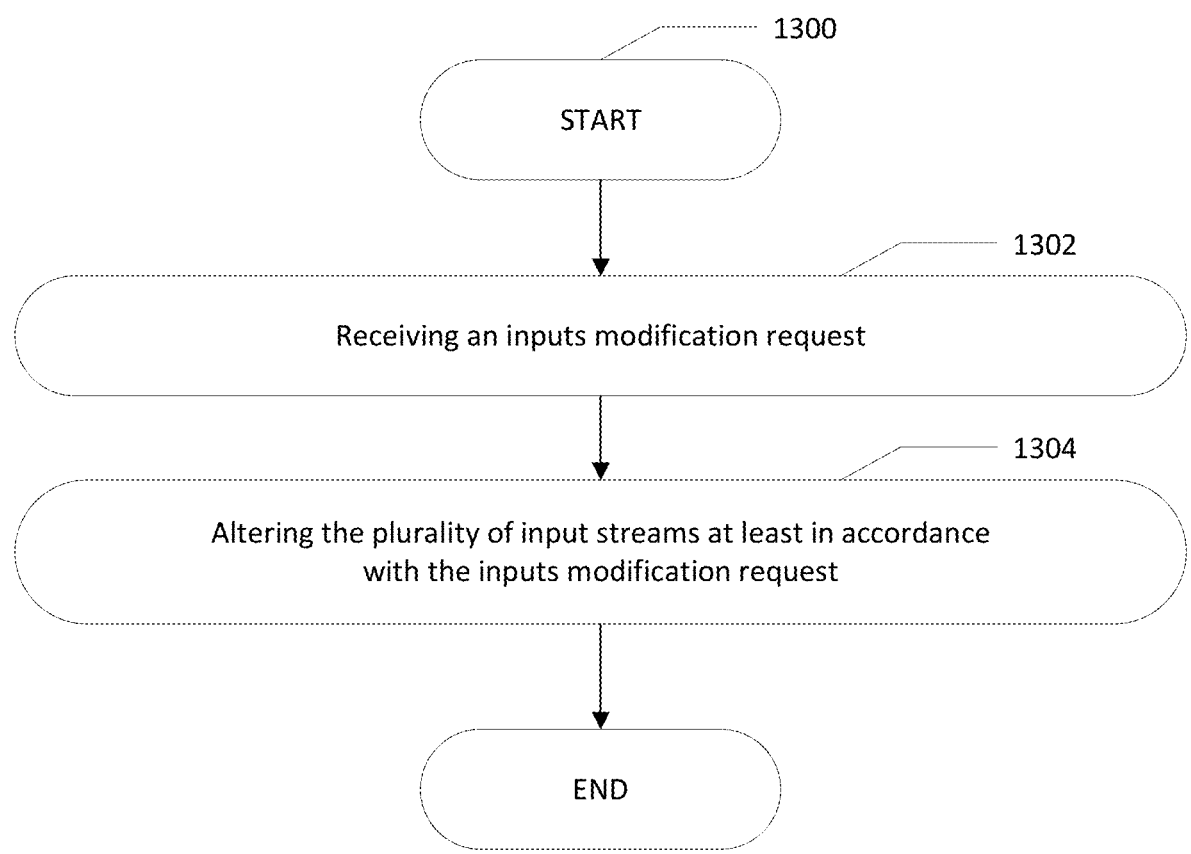

Having thus described the embodiments of the disclosure in general terms, reference now will be made to the accompanying drawings, which are not necessarily drawn to scale, and wherein:

FIG. 1A illustrates a block diagram of a system that may be specially configured within which embodiments of the present disclosure may operate;

FIG. 1B illustrates a block diagram of another system that may be specially configured within which embodiments of the present disclosure may operate;

FIG. 2 illustrates a block diagram of an example apparatus that may be specially configured in accordance with an example embodiment of the present disclosure;

FIG. 3 illustrates an example data flow for generating a common output video in accordance with at least one example embodiment of the present disclosure;

FIG. 4 illustrates an example block diagram of a specific example hardware-accelerated video multiplexer in accordance with at least one example embodiment of the present disclosure;

FIG. 5 illustrates an example data flow for hardware-accelerated video multiplexing via a specific hardware-accelerated video multiplexer in accordance with at least one example embodiment of the present disclosure;

FIG. 6 illustrates an example configuration of an output frame of a common output video in accordance with at least one example embodiment of the present disclosure;

FIG. 7 illustrates an example arrangement of processed frames in particular portions of an output frame in accordance with at least one example embodiment of the present disclosure;

FIG. 8 illustrates an example data flow for configuring a hardware-accelerated video multiplexer in accordance with at least one example embodiment of the present disclosure;

FIG. 9 illustrates a flowchart including example operations for hardware-accelerated video multiplexing in accordance with at least one example embodiment of the present disclosure;

FIG. 10 illustrates a flowchart including example operations for processing an output frame via a multiplexing image pipeline as part of a process for hardware-accelerated video multiplexing in accordance with at least one example embodiment of the present disclosure;

FIG. 11 illustrates a flowchart including example operations for configuring an input buffer via an input pipeline as part of a process for hardware-accelerated video multiplexing in accordance with at least one example embodiment of the present disclosure;

FIG. 12 illustrates a flowchart including example operations for generating an output frame from an output buffer via an output pipeline as part of a process for hardware-accelerated video multiplexing in accordance with at least one example embodiment of the present disclosure; and FIG. 13 illustrates a flowchart including example operations for altering a plurality of input video streams as part of a process for hardware-accelerated video multiplexing in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

In several different contexts, a significant number of video streams may need to be simultaneously processed and/or displayed. For example, in the context of facility surveillance, often a plurality of live video streams must be monitored by a security professional for any of a number of reasons. The number of video streams to be monitored often can grow quite rapidly, including tens, hundreds, or possibly even thousands of video streams.

The computing capabilities required to process and display such video streams is often very high. Often, each video stream produces a significant amount of video data that needs to be received, decoded, and then subsequently rendered. Often, end devices—such as a client device—had to be powerful enough to perform the decoding and subsequent rendering of each individual stream. When handling a significant number of video streams, the immense computing capabilities required for each stream can readily overwhelm a client device. In some circumstances, client devices may be equipped with specialist hardware—such as high-powered graphical processing units (GPUs)—to enable processing of more video streams. Such high-powered client devices may even be combined, for example to facilitate processing of video walls in large control center environments having many video streams to be rendered. Such implementations nevertheless are costly and still may fall short in a circumstance where requirements for such computing capabilities outpace the available resources for such implementations. In other contexts, such as viewing a plurality of video streams simultaneously on a mobile device, other restrictive factors may make efficient processing of the video streams impossible-such as limited bandwidth of such devices, limited computing capabilities of onboard CPU and GPU implementations of such devices, and/or the like. In this regard, the inventors have determined that the existing methodologies for processing a plurality of video streams for simultaneous displaying suffers from a myriad of problems.

Embodiments of the present disclosure include a common hardware-accelerated video multiplexing component that may be deployed for efficiently processing a plurality of input video streams for simultaneous displaying. Specifically, the hardware-accelerated video multiplexing component may embody a software component that utilizes specialized hardware functionality, for example of high-powered GPUs, to efficiently process data from such input video streams into a single, common output video. The common output video is processable just like any other single video stream, such that no de-multiplexing process nor multiple decoding processes are required for displaying. The hardware-accelerated video multiplexing component is flexible for advantageous use in a plurality of use cases, including server-side implementations (e.g., streaming) and client-side implementations (e.g., local displaying) of a common output video in an efficient manner. In this regard, embodiments of the present disclosure reduce the computing capabilities required by client devices for handling simultaneously displaying of a plurality of input video streams, and in some contexts reduces the displaying of a common output video to be computationally as inexpensive as conventional video streaming.

Embodiments of the present disclosure receive a plurality of input video streams, perform process(es) embodying a common video processing pipeline that generates processed image data from the plurality of input video streams, and outputs a common output video. The common output video may be a single video file or stream of data that presents the content of each of the plurality of input video streams simultaneously, for example in a grid or other visual arrangement.

The common output video may be output to any of a myriad of output types corresponding to different use cases. For example, the common output video may be outputted to a video wall embodied by or including a plurality of displays without the need for high-computing powered workstations to configure such displays, such that inexpensive TVs, monitors, or the like could be used. Alternatively or additionally, the common output video may be outputted to a mobile client device for playback without any issue posed by the low-computing capability nature of such mobile devices. Alternatively or additionally, the common output video may be outputted to one or more display(s) local to the hardware-accelerated video multiplexing component, for example to reduce the number of rendering surfaces required for displaying the data of all input video streams simultaneously. Alternatively or additionally still, the common output video may be outputted for storage to a local output file for sharing and/or playback to or outside of the system including the hardware-accelerated video multiplexing component.

The common video processing pipeline may include a plurality of sub-steps, and/or sub-processes (e.g., defined sub-pipelines for processing each input data stream) to efficiently perform the processing of the plurality of input video streams. In some embodiments, the common video processing pipeline parses and decodes data from each input video stream, then transforms the decoded data to a base format of an image primitive, and resizes the transformed image primitive. The final transformed and resized image primitive may be pushed for output to a particular frame, for example via an output buffer, for outputting to a next output frame. The common video processing pipeline may further write each scan line of the image primitive to a shared layout of a larger image primitive embodying an output frame, for example to a particular portion corresponding to the input video stream from which the data was originally taken. The output frame may be outputted, or in some embodiments encoded to a particular format for outputting, for example HEVC. In this regard, the common video processing pipeline is capable of processing input video streams with potentially different resolutions, potentially different input formats, potentially different frame rates, and/or other configuration differences to produce a common output video that includes all real-time, time-synchronized data from the various input video streams.

In some example contexts, embodiments of the present disclosure provide access to a common output video embodying a single stream representing a multiplexed presentation of various videos of input video streams. Historically, a connection would have to be maintained for each video stream between an end device and a source/server. Furthermore, processing all incoming video streams would need to occur at the same time, with each requiring a pipeline of stages to facilitate rendering. In accordance with embodiments of the present disclosure, an end device—for example embodied by a client device—is capable of establishing a single connection to a web gateway, for example, that hosts the hardware-accelerated video multiplexer as described herein for processing. In this regard, only a single pipeline of steps (e.g., parsing, decoding, processing, and rendering, for example) are performed for data from the single connection to facilitate display of the data from all input streams into a single presentation, thus reducing the computing complexity required to perform such operations.

Definitions

The term "input video stream" refers to a video file or real-time stream of video data received from a source.

The term "multiplexing image pipeline" refers to a component embodied in hardware, software, firmware, and/or a combination thereof, that outputs an input video stream to a common output video.

The term "input pipeline" refers to a component embodied in hardware, software, firmware, and/or a combination thereof, that processes an input video stream and copies an output frame to an output buffer.

The term "output pipeline" refers to a component embodied in hardware, software, firmware, and/or a combination thereof, that generates an output frame of a common output video from an output buffer.

The term "processed frame" refers to image data of a particular input video stream manipulated for outputting to an output frame of a common output video.

The term "output frame" refers to a frame of a common output video having a plurality of sub-regions corresponding to time-synchronized image data of a plurality of input video streams.

The term "common output video" refers to electronically managed data generated via at least one multiplexing image pipeline comprising a single configuration of image data sourced from a plurality of input video streams.

The term "configuration" with respect to a common output video refers to electronically managed data representing a layout of where image data from each particular input video stream is to be included in a common output video. Non-limiting examples of a configuration include data representing which rows and columns of a grid layout a particular input video stream is to be rendered within a common output video, and which sub-region of a pixel resolution a particular input video stream is to be rendered within a common output video.

The term "output configuration data" refers to electronically managed data representing one or more data values used to configure one or more data properties of a hardware-accelerated video multiplexing component. Non-limiting examples of output configuration data include data values indicating URIs for input video streams, an output frame rate, an output resolution, and/or a configuration layout.

The term "input encoding" refers to any methodology for constructing and/or processing digital video data of an input video stream for displaying, transmission, and/or storing. Non-limiting examples of an input encoding include a video file format and a video streaming format.

The term "output frame size" refers to an absolute or relative size for an output frame.

The term "base format" refers to any methodology for constructing and/or processing digital image data for processing into a common output video associated with any of one or more output types. In some embodiments, a base format embodies a common image format processable via a myriad of operating systems.

The term "client device" refers to hardware, software, firmware, and/or a combination thereof, that is configured to receive and render a common output video via one or more display(s).

The term "selected output type" refers to electronically managed data indicating a methodology utilized for outputting a common output video.

The term "inputs modification request" refers to electronically managed data that indicates a request to initiate a process for altering a plurality of input video streams by removing a video stream from the plurality of input video streams, replacing a video stream from the plurality of input video streams, or adding a new input video stream to the plurality of video streams.

The term "target video format" refers to any methodology for constructing and/or processing digital video of a common video output.

The term "packetized image data" refers to a data packet including a payload of image data and header and/or metadata configured for transmission from one device to another device over a network.

The term "data-driven alert" refers to electronically managed data indicating a determination that one or more condition(s) have been met, a process has been triggered, and/or other received request tracked by a particular system.

Example Systems and Apparatuses of the Disclosure

FIG. 1A illustrates a block diagram of a system that may be specially configured within which embodiments of the present disclosure may operate. Specifically, the system is configured for hardware-accelerated video multiplexing for use in any of a myriad of use cases. For example, in this regard the system may perform the hardware-accelerated video multiplexing for generating a common output video for a plurality of video input sources. The common output video may be outputted via any of a myriad of mechanism(s), as any of a myriad of encoding(s), and/or to any of a myriad of computing device(s), as depicted and described.

As illustrated, the system includes any of number of video input sources, for example a plurality of video input sources 104A-104N (collectively "video input sources 104"). The video input sources 104 may include any number of computing device(s), system(s), component(s), and/or the like that capture and/or store video data, such video data embodying an input video stream for processing. Non-limiting examples of a video input source include a hardwired or closed-circuit camera, a remote or wireless camera communicable via a network, a user device or other computing device including a camera as a sub-component (e.g., a smartphone or other mobile device), a mobile sensor, and/or the like. It will be appreciated that the video input sources 104 may include any number and/or combination of such video input sources.

The video input sources 104 in some embodiments are each associated with a shared environment. For example, the video input sources 104 may each correspond to a camera monitoring the same facility. Alternatively, in some embodiments the video input sources 104 are associated with different environments. For example, in some embodiments the video input sources 104 include one or more cameras monitoring different facilities, different portions of a facility, and/or the like.

In some embodiments, each of the video input sources 104 captures video data in real-time. The captured video data may represent a real-time stream of image data associated with various timestamps at which each frame of the image data is captured, for example embodied by an input video stream. Additionally or alternatively, in some embodiments, one or more of the video input sources 104 captures video data for storing and/or transmitting at a particular time (e.g., non-immediately). Such a video input source may store the image data or transmit it to an associated component or device for storing and/or subsequent forwarding.

In some embodiments, each video input source is associated with one or more data identifier(s) and/or other data value(s) utilized to identify, configure, and/or process data associated with the video input source. For example, in some embodiments, each video input source is associated with a data identifier indicating the device type of video input source. Additionally or alternatively, in some embodiments, each input video source is associated with a data identifier indicating an encoding utilized to output data from the input video source.

In some embodiments, the system includes a video intake system 108. The video intake system 108 in some embodiments includes or embodies a centralized system that that aggregates input video streams from a plurality of distributed video input sources associated with or otherwise accessible to the centralized system, for example the video input sources 104. The video intake system 108 in some embodiments includes one or more computing device(s) embodied in hardware, software, firmware, and/or a combination thereof, specially configured to communicate with the video input sources 104 and receive corresponding input video streams therefrom. In some embodiments, the video intake system 108 includes one or more server(s), personal computer(s), and/or the like, that is/are communicatively coupled with the video input sources 104. For example, in some embodiments, the video intake system 108 includes one or more server(s) that is/are connected via a wired communications network with one or more of the video input sources 104 and/or is/are connected via a wireless communications network with one or more of the video input sources 104. Additionally or alternatively, in some embodiments, the video intake system 108 includes one or more datastore(s) configured to store the received input video streams.

In some embodiments, the video intake system 108 receives input video streams from each of the video input sources 104 at all times. For example, the video intake system 108 may continuously receive input video streams embodying real-time streams of image data captured via each of the video input sources 104. The video intake system 108 in some such embodiments maintains a socket associated with each of the video input sources 106 to facilitate such transmission. Alternatively or additionally, in some embodiments, the video intake system 108 requests an input video stream from each video input source of the video input sources 104 that data is desired from. In some embodiments, the video intake system 108 utilizes a particular URI (e.g., IP address, hostname, link, device identification information, and/or the like) to access each video input source of the video input sources 104. In this regard, in some embodiments the video intake system 108 utilizes the URI to request and/or receive an input video stream for a particular video input source upon request.

The video intake system 108 may communicate with any of a myriad of specially configured device(s) and/or system (s) that perform efficient hardware-accelerated video multiplexing on one or more of the input video streams received from the video input sources 104. For example, as illustrated, the system may include one or more multiplexing video wall server(s) 106A, multiplexing streaming server(s) 106B, video management client(s) 106C, and/or video management multimonitor(s) 106D, each communicable with the video intake system 108. In some embodiments, the system only includes one, or a subset, of the one or more multiplexing video wall server(s) 106A, the multiplexing streaming server(s) 106B, the video management client(s) 106C, and/or the video management multimonitor(s) 106D ("systems 106"). Each of the system(s) 106A-106D may support a different use case of hardware-accelerated video multiplexing as described herein. In some embodiments, the video intake system 108 is optional, for example where the video input sources 104 communicate directly with one or more of the systems 106A-106D. Alternatively or additionally, in some embodiments, any one or more of the systems 106A-106D embodies or includes the video intake system 108.

The multiplexing video wall server(s) 106A includes one or more computing device(s) embodied in hardware, software, firmware, and/or a combination thereof, that outputs a common output video for displaying via a video wall embodied by video wall client(s) 110. The video wall client(s) may include or otherwise be embodied by a single large display, or a combination of interoperable displays, that displays a common output video. In some embodiments, the multiplexing wall server(s) 106A includes one or more computing device(s) embodied in software, hardware, firmware, and/or a combination thereof, that receives input video stream(s) for processing into a common output video for outputting to and/or otherwise displaying via the video wall client(s) 110. In some embodiments, the multiplexing video wall server(s) 106A is/are communicable with the video intake system 108 to receive particular input video stream(s) for processing. In some embodiments, the multiplexing video wall server(s) 106A includes one or more personal computer(s), server(s), mobile device(s), specially configured workstation system(s), and/or the like.

The multiplexing streaming server(s) 106B includes one or more computing device(s) embodied in hardware, software, firmware, and/or a combination thereof, that outputs a common output video for displaying via one or more client device(s) communicatively coupled therewith. For example, in some embodiments, the multiplexing streaming server(s) 106B outputs a common output video for displaying via one or more internet client(s) 112 and/or local client(s) 114. In some embodiments, the internet client(s) 112 include or otherwise is/are embodied by one or more client device(s) communicatively coupled with the multiplexing streaming server(s) 106B over the Internet, for example via a wired and/or wireless communications network. In this regard, the multiplexing streaming server(s) 106B may output the common output video for displaying via the internet client(s) 112 via transmission(s) over the Internet to the one or more internet client(s) 112. Additionally or alternatively, in some embodiments the local client(s) 114 include or is/are embodied by one or more client device(s) directly communicatively coupled with the multiplexing streaming server(s) 106B without connection to the Internet, for example via a wired connection to the client device(s), wired and/or wireless connection over a local area network or other private or semi-private communications network, and/or the like. In some embodiments, the multiplexing streaming server(s) 106B is/are communicable with the video intake system 108 to receive particular input video stream(s) for processing. In some embodiments, the multiplexing streaming server(s) 106B includes one or more personal computer(s), server(s), mobile device(s), specially configured workstation system(s), and/or the like.

The video management client(s) 106C includes one or more computing device(s) embodied in hardware, software, firmware, and/or a combination thereof, that outputs a common output video to a file for storing, for example such that the file embodying the common output video may be played back by the same device, or a different device to which the file is transferred, at a later time. For example, in some embodiments, the video management client(s) 106C embodies one or more specially configured client device(s) that store the common output video locally, and/or store the common output video to one or more datastore(s). In some embodiments, the video management client(s) 106C playback the file embodying the common output video via the exported video playback device 116. The exported video playback device 116 in some embodiments includes a display, remote client device, and/or other combination of hardware, software, firmware, and/or the like, that renders the data embodied in the file to display the common output video. In some embodiments, the video management client(s) 106C is/are communicable with the video intake system 108 to receive particular input video stream(s) for processing. In some embodiments, the video management client(s) 106C includes one or more personal computer(s), server(s), mobile device(s), specially configured workstation system(s), and/or the like.

The video management multimonitor system(s) 106D includes one or more computing device(s) embodied in hardware, software, firmware, and/or a combination thereof, that outputs a common output video for displaying via a plurality of displays. In some embodiments, each display embodies a monitor that is configured to output the same common output video, or interact to output different common output video(s) representing a plurality of input video streams. For example, in some embodiments, the video management multimonitor system(s) 106D generates a plurality of common output videos representing a plurality of input video streams, with each common output video of the plurality of common output videos being output to a particular monitor of the monitors 118 for displaying. The monitors 118 may include computer monitor(s), television(s), virtual display(s), and/or any other device embodied in hardware, software, firmware, and/or a combination thereof capable of rendering data. In some embodiments, the video management multimonitor system(s) 106D is/are communicable with the video intake system 108 to receive particular input video stream(s) for processing. In some embodiments, the video management multimonitor system(s) 106D includes one or more personal computer(s), server(s), mobile device(s), specially configured workstation system(s), and/or the like.

Each of the multiplexing video wall server(s) 106A, multiplexing streaming server(s) 106B, video management client(s) 106C, and video management multimonitor system(s) 106D includes a hardware-accelerated video multiplexer 102. In some embodiments, the hardware-accelerated video multiplexer 102 is embodied in hardware, software, firmware, and/or a combination thereof, that generates at least one common output video from a plurality of input video streams, and/or that outputs the at least one common output video. The hardware-accelerated video multiplexing component accesses particular hardware functionality of the device and/or system within which it is integrated to perform such functionality, for example to perform a multiplexing image pipeline as described herein that efficiently processes frames from input video stream(s) and outputs such processed frame(s) to an output frame of a common output video. In some such embodiments, the hardware-accelerated video multiplexer 102 utilizes specialized hardware, software, and/or firmware capabilities, or a combination thereof, of one or more graphical processing unit(s) onboard the system or device(s) within which the component is integrated. In this regard, the hardware-accelerated video multiplexer 102 removes the requirement for such decoding and/or other significant processing of a plurality of input video streams at the end point devices, enabling subsequent downstream client device(s) to have significantly less computing power and still function effectively (e.g., computing capabilities only to process one high-quality stream of video data).

In some embodiments, the hardware-accelerated video multiplexer 102 is modular to handle a plurality of use cases, for example those described herein with respect to each of the multiplexing video wall server(s) 106A, multiplexing streaming server(s) 106B, video management client(s) 106C, and video management multimonitor system(s) 106D. In some embodiments, the hardware-accelerated video multiplexer 102 is configurable such that the common output video is generated and/or output in a particular manner corresponding to the use case to be supported by that hardware-accelerated video multiplexer 102. In some embodiments, the hardware-accelerated video multiplexer 102 is configurable by setting one or more data value(s) for one or more data properties maintained via the hardware-accelerated video multiplexer 102 to alter the generation and/or output of a common output video for a particular use case, for example to alter the encoding utilized and/or manner in which the common output video is output. It will be appreciated that in other embodiments, the hardware-accelerated video multiplexer 102 may be configured to output a common output video in a particular manner for one or more additional and/or alternative use cases, and/or the hardware-accelerated video multiplexing component need not support all the use cases as depicted and described with respect to the system in FIG. 1.

In some embodiments, the system depicted and described with respect to FIG. 1 embodies an on-premises system. In some such embodiments, the various device(s) and/or subsystem(s) thereof may be communicable with one another over a local or direct communications network and/or corresponding mechanisms. Alternatively or additionally, in some embodiments, the system includes one or more remote and/or cloud components, for example that are communicated with over one or more communications network(s).

The optional communications network(s) in some embodiments is embodied in any of a myriad of network configurations. In some embodiments, the communications network embodies a public network (e.g., the Internet). In some embodiments, the communications network embodies a private network (e.g., an internal, localized, or closed-off network between particular devices). In some other embodiments, the communications network embodies a hybrid network (e.g., a network enabling internal communications between particular connected devices and external communications with other devices). The communications network in some embodiments includes one or more base station(s), relay(s), router(s), switch(es), cell tower(s), communications cable(s) and/or associated routing station(s), and/or the like. In some embodiments, the communications network includes one or more user controlled computing device(s) (e.g., a user owner router and/or modem) and/or one or more external utility devices (e.g., Internet service provider communication tower(s) and/or other device(s)).

Any of the computing device(s) may communicate over a whole or a portion of one or more communications network(s). For example, each of the components of the system communicatively coupled to transmit data to and/or receive data from, for example, one another over the same or different wireless or wired networks embodying the communications network. Such configuration(s) include, without limitation, a wired or wireless Personal Area Network (PAN), Local Area Network (LAN), Metropolitan Area Network (MAN), Wide Area Network (WAN), and/or the like.

FIG. 1B illustrates a block diagram of another system that may be specially configured within which embodiments of the present disclosure may operate. Specifically, FIG. 1B illustrates a cloud-based system that enables remote hardware-accelerated video multiplexing for generating and outputting a common output video to remote device(s), system(s), and/or the like via at least one communications network. The system includes a video intake system 108, web gateway(s) 152, and datastore(s) 156 within a cloud environment 160. In some embodiments, the cloud environment 160 is embodied by one or more remote computing device(s) and/or system(s) communicatively coupled over one or more communications network(s) as described above, for example via the Internet. In this regard, the system(s) within the cloud environment 160 may be accessed via an authenticated session, for example once the user has authenticated a particular client device utilizing user access credentials, a whitelisted device, and/or the like. As illustrated, the system includes like-numbered elements for the video input sources 104 and the video intake system 108, which may perform similarly or identically as described with respect to FIG. 1A. For brevity and clarity, repeated disclosure of such functionality omitted.

As illustrated, the system of FIG. 1B further includes datastore(s) 156. In some embodiments, the datastore(s) 156 includes one or more specially configured computing device(s) embodying a database. In some embodiments, the datastore(s) 156 include one or more specially configured non-transitory memory device(s), personal computer(s), end terminal(s), network attached storage(s), and/or the like. Alternatively or additionally, in some embodiments, the datastore(s) 156 embody one or more cloud database(s), for example that are remote from the video input sources 104, video intake system 108, and/or web gateway(s) 152. In some embodiments, the video intake system 108 includes or embodies the datastore(s) 156.

The datastore(s) 156 include any number of computing device(s) configured to store and/or otherwise maintain data of, or associated with accessing, one or more input video stream(s) from the video input sources 104. For example, in some embodiments, the datastore(s) 156 are configured to store recorded video data of input video stream(s) for retrieval on-demand. Additionally or alternatively, in some embodiments, the datastore(s) 156 are configured to store configuration data utilized to access a particular input video stream. For example, in some embodiments the datastore(s) 156 includes configuration data utilized to locate and authenticate access to one or more of the video input sources 104, for example to receive a corresponding input video stream. Additionally or alternatively still, in some embodiments, the datastore(s) 156 are configured to store configuration data utilized to process and/or store input video data of a particular input video stream. In some embodiments, the datastore(s) 156 enable subsequent processing of the stored input video streams.

The system of FIG. 1B further includes web gateway(s) 152. The web gateway(s) 152 includes one or more computing device(s) embodied in hardware, software, firmware, and/or a combination thereof, that generates a common output video and outputs the common output video for streaming to one or more remote client device(s). For example, as illustrated, the web gateway(s) 152 in some embodiments generate and output (e.g., by streaming) common output video(s) to video manager portal client(s) 158. The video manager portal client(s) 158 may embody client device(s) initiated by a user for accessing the web gateway(s) 152 via a browser application or native application executed via the client device(s), for example via authenticating the client device utilizing user authentication credentials to access the web gateway(s) 152. In this regard, the video manager portal client(s) 158 in some embodiments receive streamed common output video(s) for displaying via a display of or associated with the video manager portal client(s) 158. The web gateway(s) 152 in some embodiments processes the plurality of input video streams to generate a single common output video for streaming in real-time, or near-real-time (e.g., immediately after processing), to the video manager portal client(s) 158. In some embodiments, the web gateway(s) 156 maintains particular configuration data for accessing one or more of the video input sources 104, for example instead of or additional to the video intake system 108 and/or datastore(s) 156. Additionally or alternatively, in some embodiments, the web gateway(s) 152 embodies or includes the video intake system 108 and/or datastore(s) 156.

As illustrated, the web gateway(s) 152 includes a hardware-accelerated video multiplexer 102. In this regard, the hardware-accelerated video multiplexer 102 efficiently processes the data of the input video streams to generate and output the corresponding common output video. The hardware-accelerated video multiplexer 102 may be specially configurable, for example within the web gateway(s) 152, to output the common output video utilizing a particular encoding embodying a target video type for streaming transmissions.

FIG. 2 illustrates an example hardware-accelerated video multiplexing apparatus in accordance with at least some example embodiments of the present disclosure. Specifically, FIG. 2 depicts a hardware-accelerated video multiplexing apparatus 200 ("apparatus 200") specially configured in accordance with at least some example embodiments of the present disclosure. In some embodiments, a computing device and/or system including a hardware-accelerated video multiplexer, for example the multiplexing video wall server(s) 106A, the multiplexing streaming server(s) 106B, the video management client(s) 106C, the video management multimonitor system 106D, and/or the web gateway(s) 152, and/or a portion thereof, is embodied by one or more apparatus(es), such as the apparatus 200 as depicted and described in FIG. 2. The apparatus 200 includes a processor 202, a memory 204, input/output circuitry 206, communications circuitry 208, GPU(s) 210, hardware-accelerated video multiplexing circuitry 212, and optionally data processing & monitoring circuitry 214. In some embodiments, the apparatus 200 is configured, using one or more of the sets of circuitry 202, 204, 206, 208, 210, 212, and/or 214 to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with hardware-accelerated video multiplexing, for example to generate and output a common output video from a plurality of input video streams. In some embodiments, the processor 202 includes hardware, software, firmware, and/or a combination thereof, that requests and/or otherwise receives a plurality of input video streams associated with a plurality of video input sources. Additionally or alternatively, in some embodiments, the processor 202 includes hardware, software, firmware, and/or a combination thereof, that configures one or more multiplexing image pipeline(s). Additionally or alternatively, in some embodiments, the processor 202 includes hardware, software, firmware, and/or a combination thereof, that copies data to, and/or retrieves data from, a memory or memories of one or more GPUs of the apparatus 200. Additionally or alternatively, in some embodiments, the processor 202 includes hardware, software, firmware, and/or a combination thereof, that outputs a common output video, for example for display and/or transmission.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device, capture device, and/or other external computing device in communication with the apparatus 200. In some embodiments, the communications circuitry 208 receives a plurality of input video streams, and/or transmits one or more common output video(s).

The GPU(s) 210 includes one or more graphical processing unit(s). Such GPU(s) 210 may include specialized electronic circuitry that is configured for efficient image processing. The GPU(s) 210 in some embodiments includes one or more dedicated graphics card(s) that each includes its own memory/memories for use in processing (e.g., one or more RAMs). Additionally or alternatively, in some embodiments, the GPU(s) 210 is/are configured to utilize particular application programming interface(s) (APIs) that facilitate graphical operations performed by a particular software application executed by the apparatus 200, for example for performing hardware-accelerated video multiplexing to output a common output video. In some embodiments, the GPU(s) 210 includes a single GPU. In other embodiments, the GPU(s) 210 includes a plurality of GPU(s) operating in tandem. It should be appreciated that any known graphics cards and/or other graphics processing units associated with any chipset may be utilized.

The apparatus 200 may utilize the GPU(s) 210 for particular tasks. For example, in this regard, the apparatus 200 may receive particular data (e.g., image and/or video data of input video streams) via one or more of the remaining component(s) of the apparatus 200, and utilize the GPU(s) 210 for processing the video data via a multiplexing image pipeline as described herein. The processor 202 and/or the like may be utilized to communicate data to the GPU(s) 210 for such processing, and/or from the GPU(s) 210 upon completion of such processing. In this regard, the apparatus 200 may implement such heterogenous computing to facilitate efficient receiving and processing of data to generate and output a common output video.

The hardware-accelerated video multiplexing circuitry 212 includes hardware, software, firmware, and/or a combination thereof, that supports hardware-accelerated video multiplexing of a plurality of input video streams. For example, in some embodiments, the hardware-accelerated video multiplexing circuitry 212 includes hardware, software, firmware, and/or a combination thereof, that processes a plurality of input video streams to output a common output video. For example, in some embodiments the hardware-accelerated video multiplexing circuitry 212 includes hardware, software, firmware, and/or a combination thereof, that parses a frame from a particular input video stream and copies the frame to at least one graphics processing unit. Additionally or alternatively, in some embodiments, the hardware-accelerated video multiplexing circuitry 212 includes hardware, software, firmware, and/or a combination thereof, that applies an input video stream to an image multiplexing pipeline that generates processed frames and/or outputs the processed frames to a particular portion of an output frame. Additionally or alternatively, in some embodiments, the hardware-accelerated video multiplexing circuitry 212 includes hardware, software, firmware, and/or a combination thereof, that outputs one or more output frames to a common output video. Additionally or alternatively, in some embodiments, the hardware-accelerated video multiplexing circuitry 212 includes hardware, software, firmware, and/or a combination thereof, that utilizes an image multiplexing pipeline to generate decoded frame data from a parsed frame, generate resized frame data by resizing the decoded frame data, generating reformatted frame data from the resized frame data, copying the reformatted frame data to a portion of the output frame in an output buffer, copying the output buffer to an encoder, generating the output frame by encoding the output buffer via an encoder, and/or outputting the output frame to a common output video. Additionally or alternatively, in some embodiments, the hardware-accelerated video multiplexing circuitry 212 includes hardware, software, firmware, and/or a combination thereof, that process(es) inputs modification request(s). In some embodiments, hardware-accelerated video multiplexing circuitry 212 includes a separate processor, specially configured field programmable gate array (FPGA), or a specially programmed application specific integrated circuit (ASIC).

The optional data processing & monitoring circuitry 214 includes hardware, software, firmware, and/or a combination thereof, that supports functionality of any data processing application that affects the input video stream(s) processed via the apparatus 200. For example, in some embodiments, the data processing & monitoring circuitry 214 receives and/or generates indication(s) representing request(s) to alter a plurality of input video streams and/or reconfigure a common output video associated with a plurality of input video streams. Additionally or alternatively, in some embodiments, the data processing & monitoring circuitry 214 includes hardware, software, firmware, and/or a combination thereof, that generates and/or receives data-driven alert(s) associated with a particular input video stream, for example indicating that the particular input video stream may need to be displayed. In some embodiments, the data-driven alert(s) embody movement detected within and/or other data-driven determination(s) regarding the content of image data of a particular input video stream. Additionally or alternatively, in some embodiments, the data processing & monitoring circuitry 214 includes hardware, software, firmware, and/or a combination thereof, that determines a plurality of input video streams to be processed. Additionally or alternatively, in some embodiments, the data processing & monitoring circuitry 214 includes hardware, software, firmware, and/or a combination thereof, that alters the plurality of input video streams being processed to include particular input video streams determined by the apparatus 200. In some embodiments, data processing & monitoring circuitry 214 includes a separate processor, specially configured field programmable gate array (FPGA), or a specially programmed application specific integrated circuit (ASIC).

Additionally or alternatively, in some embodiments, two or more of the sets of circuitries 202-214 are combinable. Alternatively or additionally, in some embodiments, one or more of the sets of circuitry perform some or all of the functionality described associated with another component. For example, in some embodiments, two or more of the sets of circuitry 202-214 are combined into a single module embodied in hardware, software, firmware, and/or a combination thereof. Similarly, in some embodiments, one or more of the sets of circuitry, for example the hardware-accelerated video multiplexing circuitry 212 and/or data processing & monitoring circuitry 214 is/are combined with the processor 202, such that the processor 202 performs one or more of the operations described above with respect to each of these sets of circuitry 210-214.

Example Data Flows and Data Architectures of the Disclosure

Having described example systems and apparatuses of the disclosure, example visualizations of data flows and data architectures for hardware-accelerated video multiplexing will now be discussed. In some embodiments, one or more specially configured computing device(s) is configured via hardware, software, firmware, and/or any combination thereof, to perform such data flow(s) utilizing the data architecture(s). For example, in some embodiments, the apparatus 200 maintains data environments to perform the data flows utilizing the data architectures as depicted and described with respect to FIGS. 3-8.

FIG. 3 illustrates an example data flow for generating a common output video in accordance with at least one example embodiment of the present disclosure. Specifically, FIG. 3 depicts a data flow for generating a common output video 306 from a plurality of input video streams, specifically the input video streams 302A-302F. Each input video stream embodies video data from a different video source. For example, in some embodiments, the video data includes various frames of image data, each image data associated with a particular timestamp at which the frame was captured (e.g., based on a particular framerate at which the corresponding video input source captures data). As illustrated, the input video streams 302-302F includes nine independent input video streams, but in other contexts may include any number of input video streams.

The input video streams 302A-302F are inputted to a hardware-accelerated video multiplexing component 304. In some embodiments, the hardware-accelerated video multiplexing component 304 is embodied by a software application executed on particular hardware, for example via one or more GPUs, to execute particular multiplexing image pipelines that process each of the input video streams 302A-302F. The hardware-accelerated video multiplexing component 304 in some embodiments processes each input video stream of the plurality of input video streams 302A-302F to generate processed frames and output the processed frames to particular portion(s) of a common output video 306. For example, in some embodiments, the hardware-accelerated video multiplexing component 304 outputs each processed frame to a portion of an output frame that corresponds to the input video stream from which the frame was parsed. The output frames in some embodiments are subsequently outputted to generate the common output video 306, for example including a time-synchronized arrangement of the output frames. In this regard, in some embodiments the common output video 306 embodies a single stream of data including a representation of the image data from each input video stream at a particular timestamp of a plurality of timestamps.

In some embodiments, an output frame of the common output video 306 is embodied in a particular grid layout. The grid layout may include defined visual areas embodying particular portions that each correspond to image data from a particular input video stream. FIG. 3 depicts an example output frame 310. The output frame 310 includes a grid layout, each portion embodying an area of the output frame 310 to which image data is renderable. For example, as illustrated with respect to output frame 310, the output frame 310 includes different portions of equal size, each corresponding to a particular input video stream of the input video streams 302A-302F. Specifically, as illustrated, the output frame 310 includes data from each input video stream in order beginning from the top left to the right, and top to bottom. In this regard, the image data from each input video stream is arranged in the particular portion of the output frame 310 that corresponds to the input video stream. Each portion of the output frame 310 may be defined in any of a myriad of manners, for example, by a defined arrangement of rows and columns, and/or defined portions of pixel sub-regions.

FIG. 6 illustrates an example configuration of an output frame of a common output video in accordance with at least one example embodiment of the present disclosure. Specifically FIG. 6 illustrates an output frame 600 configured via a plurality of columns and a plurality of rows that define portions of the output frame 600 within which image data may be rendered. In some embodiments, the output frame 600 embodies the configuration of each frame of a particular common output video.

As illustrated, the output frame 600 is configured based on a plurality of columns 602 and a plurality of rows 604. In some embodiments, each row and column is associated with a particular size. For example, each column of the plurality of columns 602 may correspond to a particular width across the area of the output frame 600, and similarly the plurality of rows 604 may correspond to a particular height across the area of the output frame 600. It will be appreciated that the number of rows and number of columns may be the same, and in some embodiments the number of rows and the number of columns differs. For example, in some embodiments, the plurality of columns 602 includes a number of columns and the plurality of rows 604 includes a plurality of rows that corresponds to a particular target aspect ratio or resolution for the output frame 600.

It should be appreciated that each of the rows and columns of the plurality of columns 602 and plurality of rows 604 defines a particular portion of the output frame 600. For example, the cross section of a particular row and a particular column may define a particular portion embodied by the intersection of the width and height defined by the column and the row, respectively. In this regard, each combination of row and column may correspond to a particular portion of the output frame 600 that includes a particular range of pixels to which image data may be rendered.

In some embodiments, the plurality of rows 604 and plurality of columns 602 are identified by a particular index, for example representing the position of each particular row and/or column from an origin point and/or with respect to other rows and/or columns of the output frame 600. In some embodiments, for example, a row index of 0 corresponds to the top row, and a column index of 0 corresponds to the left-most column. Accordingly, a particular portion of the output frame 600 defined by the index (0, 0) in (row, column) format may correspond to the intersection of the top row and left column, with (0, 1) corresponding to the top row and next column immediately to the right of the left-most column. Such index demarcation may be utilized to reference and/or identify particular portions of the grid construction embodying the output frame 600.

In this regard, in some embodiments, the grid layout may be utilized to output particular data to particular portions defined by a row index and column index, or a range defined by plurality of row indices and/or plurality of column indices. For example, FIG. 7 illustrates an example arrangement of processed frames in particular portions of an output frame in accordance with at least one example embodiment of the present disclosure. Specifically, FIG. 7 depicts an arrangement of different portions of output frame 600 assigned different image data from a plurality of input video streams. In this regard, the particular arrangement of the output frame 600 may be utilized to output a plurality of output frames, each in the same arrangement of image data from different input video streams and having different image data at different timestamps from the corresponding input video streams. For example, in some embodiments, the apparatus 200 processes a plurality input video streams to generate processed frames for a particular timestamp from each input video stream, and output the processed frames to a particular portion of the output frame 600.

In some embodiments, a configuration layout of the output frame (e.g., where data from a particular input video stream is to be included in the output frame) is predefined. Alternatively or additionally, in some embodiments, the configuration layout of the output frame is previously received or previously automatically determined, for example by the apparatus 200. Additionally or alternatively still, in some embodiments, the configuration layout of the output frame is defined based at least in part on user input. For example, in some embodiments, a user provides user input via a user device, client device, and/or the like that defines the portion of an output frame corresponding to a particular input video stream. In some embodiments, the apparatus 200 (for example) store configuration data representing the layout for subsequent retrieval and use in creating an output frame.

As illustrated, the output frame 600 includes a first portion 702, a second portion 704, a third portion 706, and fourth portion 708. In some embodiments, each of the portions corresponds to a particular input video stream, such that a processed frame associated with the particular input video stream is outputted to the corresponding portion of the output frame 600 corresponding to that input video stream. For example, a first input video stream corresponds to the first portion 702, a second input video stream corresponds to the second portion 704, a third input video stream corresponds to a third portion 706, and a fourth input video stream corresponds to the fourth portion 708. In some embodiments, each portion is defined by a row index and column index, and/or a row index and column index together with a row span and/or column span. In some such embodiments the row index indicates a starting row of a grid layout where the portion begins and the column index indicates a starting column of the grid layout where the portion begins. Additionally or alternatively, in some embodiments, the row span indicates a number of rows included in the portion, and the column span indicates a number of columns included in the portion. As illustrated for example, the first portion 702 is associated with a column span 710 having a value of 4 (e.g., 4 columns spanned by the portion) and a row span 712 having a value of 2 (e.g., 2 rows spanned by the portion).

In some embodiments, the apparatus 200 maintains data indicating the portion of the data frame 600 associated with each input video stream. For example, in some embodiments, the apparatus 200 maintains, for each input video stream, a data object including a row index, a column index, a row span, and a column span associated with a particular stream identifier corresponding to a particular input video stream. In this regard, the data object may be utilized to identify the portion of the output frame for a particular input video stream utilizing an identifier corresponding to that input video stream.

The grid layout depicted and described embodies an example layout for the output frame 600. In other embodiments, the output frame may be constructed in another manner, for example such that portions of the output frame are defined utilizing other indicators. In some embodiments, the output frame is configured with portions defined by pixel sub-regions.

FIG. 4 illustrates an example block diagram of a specific example hardware-accelerated video multiplexer in accordance with at least one example embodiment of the present disclosure. In some embodiments, the specific hardware-accelerated video multiplexer as depicted in FIG. 4 includes the software components maintained as a data environment on the hardware of a hardware-accelerated video multiplexer, for example via one or more GPUs and/or associated CPUs. Further as depicted, the hardware-accelerated video multiplexer may be embodied utilizing particular GPUs configured to utilize particular APIs, for example configured to utilize Nvidia CUDA APIs, Direct3D library of graphics APIs, and/or the like. The hardware-accelerated video multiplexer as depicted is utilized to build a multiplexed presentation 402, for example embodying a common output video. The common output video may include a plurality of output frames generated from data of a plurality of individual input video streams.

In some embodiments, a host application executing or embodying the example hardware-accelerated video multiplexer via one or more computing device(s), for example via the apparatus 200, generates a new multiplexed presentation 402 and provides configuration data indicating a description of the multiplexed presentation 402. In some embodiments, such configuration data includes description data embodying a grid of multiplexing configuration data, or at least a portion thereof (e.g., a definition of grid rows and columns for a grid layout configuration, URIs for input video streams, output resolution, an output frame rate, an output bitrate, and/or the like). The host application may create a single stream manager object, such as the stream manager 408, and a single video grid object, such as the video grid 404, As illustrated, for example, the hardware-accelerated video multiplexer includes or defines the video grid 404. In some embodiments, the video grid defines an empty layout of rows and columns, for example embodying an empty frame to be filled with portions of video data from input video streams as part of the multiplexed presentation 402. In this regard, the video grid 404 may be generated based on particular configuration data (e.g., of multiplexing configuration data) defining a number of rows and columns, for example, together with a reference to the stream manager 408 to be utilized to assign portions of video data to layout defined by the video grid 404. In some embodiments, when a new video data is added, the hardware-accelerated video multiplexer creates a video data object, for example corresponding to one or more of the videos 406A-406D, via the stream manager 408.video grid 404, In some embodiments, each of the videos 406A-406D embodies a plurality of image data frames and associated timestamps, for example captured by a particular video input source. As illustrated, for example, each of the videos 406A-406D may be provided by a stream manager 408. In some embodiments, the stream manager 408 embodies a singleton that retrieves an input video stream for a particular video input source, for example the input video streams 410A-410D. In some embodiments, the stream manager 408 retrieves each of the input video stream(s) 410A-410D utilizing a particular URI for each of the corresponding video input sources, which may be received via the video grid 404 and/or other component of or communicable with the hardware-accelerated video multiplexer. In some embodiments, each video of the videos 406A-406D embodies the image data for particular timestamps received via each of the input video streams 410A-410D.

Specifically, as illustrated, the video grid 404 may receive data of a plurality of videos, specifically videos 406A-406D. Each video 406A-406D in some embodiments is made aware of the corresponding position in a particular layout, for example based at least in part on a row index and/or column index, and/or a column span and/or row span, associated with a grid layout within which the video is to be positioned. In this regard, each video may be configured to utilized such data to compute the video's output size within a particular configuration layout (e.g., the video grid 404), the video's start position, and scan line sizes within a particular buffer (e.g., a swap chain back buffer). In some embodiments, the video grid 404 may persist the videos 406A-406D in a map or dictionary data object. In some such embodiments, the key for each dictionary entry utilizes one or more indices, for example the column index and row index in a (column, row) tuple. In this regard, the video grid 404 may embody a collection of video-to-position relationships for a particular configuration (e.g., a video-to-grid relationship using column-row pairs).

The image data from the videos 406A-406D in some embodiments is written to particular portions of the swap chain 412. The written video data from the videos 406A-406D (e.g., image data embodying a particular frame of the input video stream) may be written to a back buffer of the swap chain 412. In this regard, when a subsequent function for presenting the back buffer is triggered (e.g., a present( ) call as described herein), for example by the IRenderer 416 in accordance with the presentation clock 414, the data may be copied from the back buffer to the screen buffer. In this regard, the copied data from the back buffer may embody the output frame.

In some embodiments, output frames from the swap chain 412 are further processed based on a presentation clock 414. For example, the presentation clock 414 in some embodiments represents a timer between processing output frames from the swap chain 412. In this regard, the presentation clock 414 may be configured based on a particular framerate, such that the data written to the swap chain 412 is processed for outputting to the multiplexed presentation 402, for example, in accordance with the particular framerate.

In some embodiments, the presentation clock 414 ticks at a particular rate that is untethered from a real-time framerate associated with a common output video. For example, in some embodiments, a particular hardware-accelerated video multiplexer is utilized to generate a common output video embodying a stream at a particular target output framerate of 25 frames per second, however the presentation clock 414 may operate at the presentation clock 414 may be configured to process at a framerate of 200 frames per second. In one example context, the presentation clock 414 may perform such expedited processing in a circumstance where the common output video is being generated utilizing pre-recorded or otherwise previously stored video data from input video streams. In some embodiments, the presentation clock 414 processes continually, at the maximum rate possible, to generate an output stream from such pre-recorded input video streams. In some embodiments, each output frame is timestamped with a particular corresponding timestamp (or in some embodiments, timestamp interval to account for small but unnoticeable differences in frame rates leading to different exact timestamps for particular videos) such that the frames may be particularly played back in accordance with the desired output framerate regardless of the rate at which such frames were processed and output in accordance with the presentation clock 414.

In some embodiments, the swap chain 412 is processed via an IRenderer 416. In some embodiments, the IRenderer 416 outputs a particular output frame from the swap chain 412 for rendering, for example upon initiation in accordance with the presentation clock 414. In some embodiments, the output frame is rendered based on a particular selected output type. The selected output type in some embodiments corresponds to a particular use case in which the multiplexed presentation 402, for example embodying a common output video, is differently outputted. In some embodiments, a selected output type corresponds to a particular function call (e.g., write( ), show( ), send( ), and/or the like) configured to be performed by a particular IRenderer when called via the apparatus 200, for example. including the hardware-accelerated video multiplexer.

Example use cases are depicted via elements 418, 420, 422, and 424, however it should be appreciated that in other embodiments, any other renderer may be utilized where configured to produce a particular output. In some embodiments, producing the output itself utilizes the GPU. For example, in some embodiments, the IRenderer use cases corresponding to elements 418, 420, 422, and 424 utilizes a GPU for rendering. However, in other embodiments, producing the output itself may not involve the GPU. For example, an IRenderer may be configured that produces a sequence of image files (e.g., PNG files, BMP files, and/or the like) such that use of the GPU for outputting is not necessary. Similarly, in some embodiments, an IRenderer may be configured that emits particular image primitives, for example those utilized for particular subsequent video encoding such as YUV420 and/or NV12, and may not utilize the GPU for outputting. In this regard, in some embodiments, the hardware-accelerated video multiplexer may utilize particular GPU API calls for input/output purposes, for example to read, write, copy, and/or otherwise manipulate data to/from a particular global memory of the apparatus 200 for example, and/or to perform particular compute calls that process or otherwise manipulate one or more aspects of data for subsequent outputting.

For example, in some embodiments, the hardware-accelerated video multiplexer is configured for outputting a raw file via the IRenderer 418. In such some embodiments, the raw image data may be outputted to a file output 426. Such raw image data may subsequently be written by the file output 426 to a particular file having a raw file format. In this regard, IRenderer 418 may perform a write operation from one or more available GPU API(s) to write the output frame from the swap chain 412 to the particular raw output file embodied by the file output 426.

In some embodiments, the hardware-accelerated video multiplexer is configured for outputting a container file via the IRenderer 420. In some such embodiments, the container file may embody a media container that encodes the multiplexed presentation in a particular target video format, for example representing a particular encoding type. In this regard, the IRenderer 420 may perform a write operation from one or more available GPU API(s) to write an encoding of the output frame from the swap chain 412 to the particular container file embodied by the file output 426.

In some embodiments, the hardware-accelerated video multiplexer is configured for outputting a surface via the IRenderer 422, for example to a particular window of a particular display. In some such embodiments, the surface may embody a rendered presentation of the output frame. In this regard, the IRenderer 422 may perform a show operation from one or more available GPU API(s) to render the output frame as a surface.

In some embodiments, the hardware-accelerated video multiplexer is configured for outputting packetized data via the IRenderer 424, for example for real-time streaming transmission to another device. The packetized data may be encoded by a packetizer to be in a format efficient for streaming transmission. In some embodiments, the packetized data is transmitted via the socket stream output 430 to a corresponding receiver. In this regard, the IRenderer 424 may perform a send operation from one or more available GPU API(s) to packetize and/or transmit the output frame as packetized data to a target device.

It should be appreciated that once a multiplexed presentation 402 is built and output, the hardware-accelerated video multiplexer may continue to process subsequent data and build a subsequent multiplexed presentation 402. In this regard, as image data is received via an input video stream, such data may continually be utilized to update the multiplexed presentation and push the updated multiplexed presentation 402 for outputting for any of a myriad of the described use cases.

FIG. 5 illustrates an example data flow for hardware-accelerated video multiplexing via a specific hardware-accelerated video multiplexer in accordance with at least one example embodiment of the present disclosure. For example, the data flow may be performed by a specific hardware-accelerated video multiplexer, for example embodied by a specific implementation of the apparatus 200 and/or as depicted and described with respect to FIG. 4. As illustrated, the specially configured hardware-accelerated video multiplexer may be configured to utilize particular GPU types and/or GPU APIs, for example NVIDIA GPUs that support NVIDIA CUDA and Direct3D. It will be appreciated that in some embodiments, other GPU types and/or GPU APIs may similarly be utilized without deviating from the scope and spirit of this disclosure.

The example data flow depicted and described in FIG. 5 embodies an example multiplexing image pipeline. As illustrated, the specific multiplexing image pipeline includes a plurality of sub-pipelines, specifically (1) an input pipeline that receives an input frame for an input video stream and generates a processed frame (e.g., in a base format) configured for use in outputting in accordance with any of a number of use case, and (2) an output pipeline that identifies and processes a processed frame for outputting as an output frame of a common output video in accordance with a particular use case. For example, in some embodiments, the input pipeline includes operations 502-512 (e.g., with 506-512 performed via one or more GPU(s)) of the data flow as depicted, and the output pipeline includes operations 514-528. In some embodiments, each sub-pipeline corresponds to a particular memory portion of one or more GPUs, and/or may operate at different clock rates.

The input pipeline, for example beginning at operation 502, may be triggered and/or initiated in any of a myriad of manners. For example, in some embodiments, an input video stream is processed in real-time, such that when video data embodying a frame of an input video stream is received, such as by the apparatus 200, it is processed or queued for processing. In some such embodiments, the output pipeline, for example beginning at operation 514, similarly is triggered in real-time as the new video data is received. One such example context include a live-streaming use case. Alternatively or additionally, in some embodiments, the input pipeline is triggered by a particular clock cycle, for example in response to an event triggered by a presentation clock. Additionally or alternatively, in some embodiments, the output pipeline is triggered by the same particular clock cycle, for example in response to the event triggered by the presentation clock. In this regard, the hardware-accelerated video multiplexing pipeline may be entirely timed based on the ticks of the particular presentation clock.

At operation 502 the compressed frame is in the host buffer. In some embodiments, the host buffer is embodied via a memory of the apparatus 200 that is off one or more GPUs that perform the image processing operations of the multiplexing image pipeline. The compressed frame may be in the host buffer in response to receiving a input video stream including the compressed frame via the apparatus 200. In some embodiments, the host buffer is maintained by a CPU of the apparatus 200.

At operation 504, the compressed frame is copied to the device. The device may embody one or more GPU(s) configured for performing the hardware-enabled video multiplexing operations embodied by the multiplexing image pipeline. In some embodiments, a CPU of the apparatus 200 copies the frame to a memory of one or more GPUs of the apparatus 200.

At operation 506, the device decodes the frame. In some embodiments, the frame is decoded utilizing NVDEC, the Nvidia decoder, on the one or more GPU(s) of the apparatus

200. The resulting decoded data may embody a digital video frame for further processing. It will be appreciated that in other embodiments an alternative video decoder (e.g., other than NVDEC) may be utilized.

At operation 508, decoded data is resized utilizing the a CUDA kernel. The resizing generates resized frame data. In this regard, the GPU(s) is/are utilized to resize the decoded frame to a particular target size. The CUDA kernel may be launched via a CUDA runtime API to execute the particular operations embodied by the CUDA kernel, for example utilizing various cores on one or more GPU(s). Thus, the particular CUDA kernel may be specially configured for execution by such cores to perform the resizing. It will be appreciated that the particular implementation of the CUDA kernel may differ, however may nevertheless generate a resized frame embodied by the resized frame data. For example, any of a myriad of known and/or custom CUDA kernels for each of resizing, pixel formatting, copying image fragments, and/or the like may be utilized in the operations described herein. In some other embodiments, the CUDA kernel may be embodied by a generic compute kernel (e.g., in OpenCL for example), one or a series of pipeline stages embodied in sub-programs or instructions, and/or the like.

At operation 510, the resized decoded data undergoes a pixel format conversion utilizing the another CUDA kernel. The pixel format conversion generates reformatted frame data. The CUDA kernel may be launched via a CUDA runtime API to execute the particular operations embodied by the CUDA kernel, for example utilizing the various cores on one or more GPU(s). Thus, the particular CUDA kernel may be specially configured for execution by such cores to perform the reformatting. In some embodiments, the pixel format conversion reformats the data of the frame to a particular base format, for example to be utilized in any of a number of output use cases. In some embodiments, the pixel format conversion reformats the frame to a RGB format or a RGBA format.

At operation 512, the reformatted frame data is copied to a swap chain back buffer. The back buffer of the swap chain may embody a newest processed frame for further outputting, for example via an output pipeline in accordance with one or more intended use case. For example, the swap chain may include at least a back buffer (where an output frame is currently being constructed, such as for the current timestamp) and another buffer (e.g., a front buffer or a screen buffer) including a fully constructed output frame ready to be outputted. It should be appreciated that the swap chain may include one or more additional buffers, for example including previously-constructed intermediary frames similarly awaiting output.

At operation 514, the GPUs are triggered to present the swap chain, for example including the processed frame. For example, in some embodiments, the presentation of the swap chain is controlled by a tick rate of a particular presentation clock, which invokes a render function on a configured IRenderer and a present call on the swap chain. The present call may copy the data from the back buffer to the front buffer (e.g., a screen buffer, for example). In this regard, subsequently the copied frame may be utilized to produce an output frame while subsequent video data is utilized to resume constructing the next frame in the back buffer. The GPUs may subsequently process the processed frame within the swap chain differently based on a desired output. For example, in some embodiments the GPUs are configured based at least in part on a particular selected output type.

In a circumstance where the processed frame is to be outputted as a common output video rendered to a screen, the pipeline proceeds to operation 516. At operation 516, the swap chain screen buffer is mapped to a D3D11 texture. In this regard, the D3D11 texture may correspond to a particular portion of the swap chain screen buffer. At operation 518, the D3D11 swap chain is presented, such that a rendered image is displayed via one or more display(s).

In a circumstance where the processed frame is to be encoded and outputted, the pipeline proceeds to operation 520. At operation 520, the swap chain scree buffer is copied to a NVENC input buffer. In some embodiments, the NVENC input buffer embodies an output buffer for the final common output video. The NVENC input buffer may represent a different portion of memory utilized by the NVENC encoder.

At operation 522, the output frame embodied in the NVENC input buffer is encoded using NVENC. The output frame may be encoded to a particular encoding format, for example H.264, H.265 and/or the like. At operation 524, the encoded frame is then copied to the host. In this regard, a CPU of the apparatus 200 may copy the frame from the GPU(s) that performed the multiplexing image pipeline. The copied frame from the GPU embodies an output frame of the common output video.

The output frame may be outputted differently based on the intended use case, for example corresponding to a particular selected output type. In a circumstance where the common output video is to be stored as a file, for example, flow proceeds to operation 526. At operation 526, the apparatus 200 writes the output frame copied to the host to a file. The output frame may be written as the next frame of a file embodying the common output video.

In a circumstance where the common output video is to be streamed, for example, flow proceeds to operation 528. At operation 528, the apparatus 200 packetizes the output frame for transmission. The output frame may be packetized and transmitted as the next streamed frame in a data stream embodying the common output video.

Some embodiments of the present disclosure are configurable before and/or during the hardware-accelerated video multiplexing. FIG. 8 illustrates an example data flow for configuring a hardware-accelerated video multiplexer in accordance with at least one example embodiment of the present disclosure. Specifically, the data flow in FIG. 8 depicts transmission of multiplexing configuration data utilized to configure a hardware accelerated video multiplexer in accordance with the present disclosure.

In some embodiments, multiplexing configuration data 802 is identified and/or received for configuring a particular hardware-accelerated video multiplexer. The multiplexing configuration data 802, and/or portion(s) thereof, may be identified and/or otherwise received in any of a myriad of manners. In some embodiments, a user accesses a particular user device, client device, and/or the like to provide user input representing one or more portion(s) of multiplexing configuration data 802. In some such embodiments, the user may access a particular user interface produced via the particular device, input voice command(s), peripheral interaction(s), gesture data, and/or other user input via the particular device, and/or the like. Such user input may represent a data value for one or more parameters of the multiplexing configuration data 802. For example, the user may interact with a particular user interface on a client device or other user device to drag and drop user interface elements corresponding to particular input video streams to particular positions within a grid layout defining a particular configuration. Alternatively or additionally, in some such embodiments, one or more portions of the multiplexing configuration data 802 is predetermined or otherwise stored, for example via the apparatus 200. In some embodiments, for example, a user provides user input corresponding to the video source URIs 804D and the particular configuration layout defined by the presentation configuration data 804A, and the remaining information is retrieved from a datastore of configuration data and/or otherwise identified as predetermined.

The multiplexing configuration data 802 may include various sub-portions of data utilized to configure particular data properties of the hardware-accelerated video multiplexer. For example, as illustrated, the multiplexing configuration data 802 includes a first portion of data embodying presentation configuration data 804A. In some embodiments, the presentation configuration data 804A defines a particular layout configuration for output frames of a common output video generated by the hardware-accelerated video multiplexer. For example, in some embodiments, the presentation configuration data 804A defines a configuration representing a grid layout of rows and columns, where different portions of an output frame are definable based on combinations of the rows and columns. In some embodiments, the presentation configuration data 804A is utilized by a particular video grid object to indicate a particular number of rows and/or columns embodying a configuration layout of a common output video. Additionally or alternatively, in some embodiments, the presentation configuration data 804A is utilized to assign particular arrangements of video data from input video streams to particular portions of the configuration layout, for example particular rows and/or columns.

Additionally or alternatively, for example as illustrated, in some embodiments the multiplexing configuration data 802 includes a second portion of data embodying presentation output resolution 804B. The presentation output resolution 804B represents a particular target resolution for each output frame of a common output video. In some embodiments, the presentation output resolution 804B is utilized to configure a particular size of one or more buffer(s) allocated, for example to a GPU, for processing video data from one or more input video stream(s). In some embodiments, the target resolution corresponds to one or more display(s) that will be utilized to render the common output video.

Additionally or alternatively, for example as illustrated, in some embodiments the multiplexing configuration data 802 includes a third portion of data embodying a presentation output frame rate 804C. The presentation output frame rate 804C represents a rate at which output frames for a common output video are to be generated. In this regard, the presentation output frame rate 804C may similarly represent a framerate of the common output video outputted via the image processing performed by the hardware-accelerated video multiplexer. In some embodiments, the presentation output frame rate 804C is utilized to configure a presentation clock to a particular tick rate.

Additionally or alternatively, for example as illustrated, in some embodiments the multiplexing configuration data 802 includes a fourth portion of data embodying video source URIs 804D. The video source URIs 804D may include each URI corresponding to a particular video input source from which an input video stream is to be received. The video source URIs 804D may include an IP, hostname, or other network identifier corresponding to the video input source, for example that may be utilized to request the input video stream from said source. In this regard, each URI of the video source URIs 804D may be utilized as a connection endpoint to retrieve a particular input video stream.

The multiplexing configuration data 802, and/or various data portions thereof, may be determined in any of a myriad of manners. For example, in some embodiments, the apparatus 200 automatically determines the multiplexing configuration data 802 and/or one or more portions thereof. In some such embodiments, the apparatus 200 includes one or more predetermined portions of the multiplexing configuration data 802, for example embodying static configuration settings. Alternatively or additionally, in some embodiments, the apparatus 200 receives the multiplexing configuration data 802, or a portion thereof, in response to user input and/or transmission. For example, in some embodiments, the user may utilize a frontend application executing on a user device to input a configuration layout embodying presentation configuration data 804A, a desired output resolution embodying presentation output resolution 804B, a desired output frame rate embodying presentation output frame rate 804C, and/or one or more URIs corresponding to all possible video input sources and/or selected video input sources from which a plurality of input video streams is to be received.

In some embodiments, the multiplexing configuration data 802 is utilized to configure a hardware-accelerated video multiplexer 806. For example, the apparatus 200 may configure one or more software settings and/or hardware configurations(s) (e.g., the GPU(s) 210 executing one or more multiplexing image pipeline(s)) corresponding to properties of the multiplexing configuration data 802. In one example context, the hardware-accelerated video multiplexer 806 embodies a software component executed by specially configured GPU(s) of the apparatus 200, such that one or more presentation clock(s) of the GPU(s) are configured based on the presentation output frame rate 804C, one or more data properties representing the resolution and/or configuration of the output frame are configured based on the presentation output resolution 804B and the presentation configuration data 804A, respectively, and one or more data structures storing the video source URIs 804D are configured for subsequent use (e.g., in establishing and maintaining socket(s) and/or other authenticated states of communication for receiving the input video streams from via the URIs represented therein).

In some embodiments, the apparatus 200 initiates presentation 808 after configuration of the hardware-accelerated video multiplexer 806. In this regard, upon initiation of presentation 808, the apparatus 200 may begin to receive input video streams for one or more video input sources and process such data via the pipelines as described herein for outputting corresponding output frames to a common output video.

In some embodiments, one or more other aspects of the hardware-accelerated video multiplexer 806 is configurable before and/or during operation of the hardware-accelerated video multiplexer 806. A user, for example, may alter one or more of such aspects via a frontend application executing on a user device that is utilized to configure the hardware-accelerated video multiplexer. For example, in some embodiments, a user may input new presentation configuration data 804A embodying a new configuration layout to be utilized. Alternatively or additionally, in some embodiments, the user may associate particular portions of a configuration layout with particular input data streams, for example embodying input video streams. For example, in some embodiments, the user may select particular rows and/or columns to correspond to a particular video input source, such that the video input stream from that video input source is rendered in the portion of the layout selected by the user. Subsequently, the user may alter, move, and/or otherwise manipulate the associated portion for a particular video input source.

Additionally or alternatively, in some embodiments, the user may alter the particular video input sources having data to be outputted via a common output video. For example, in some embodiments, the user may select a subset of a complete set of candidate video input sources from which input video streams should be processed. In this regard, for example, the user may select only the video input sources that the user desires to view, and/or otherwise that the user determines as having relevant video data for viewing. Alternatively or additionally, in some embodiments, the user may utilize the frontend application to subsequently alter the desired input video streams to be processed. For example, in some embodiments, the user may utilize the frontend application to select a particular set of video input sources to be processed, and generate a inputs modification request include new video source URIs 804D corresponding specifically to such selected set of video input sources (e.g., that may include one or more new video input source(s) not previously selected, replaced video input source(s), and/or removed video input source(s)).

Example Processes of the Disclosure

Having described example systems and apparatuses, data architectures, and data flows in accordance with embodiments of the present disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 9 illustrates a flowchart including example operations for hardware-accelerated video multiplexing in accordance with at least one example embodiment of the present disclosure. Specifically, FIG. 9 depicts operations of an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one user device, display(s), client device(s), and/or the like. For purposes of simplifying the description, the process 900 is described as performed by and from the perspective of the apparatus 200.

The process 900 begins at optional operation 902. At optional operation 902, the apparatus 200 includes means such as a hardware-accelerated video multiplexing circuitry 212, GPU(s) 210, communications circuitry 208, input/output circuitry 206, and/or processor 202, and/or a combination thereof, that receives output configuration data. The output configuration data may include any number of portions of data utilized in configuring one or more properties of a common video output. Additionally or alternatively, the output configuration data configures the apparatus for receiving particular input video streams. In this regard, the apparatus 200 utilizes the output configuration data to configure socket(s) maintained by the apparatus 200, properties of one or more multiplexing image pipeline(s), and/or the like.

For example, in some embodiments, the output configuration data includes first data representing a plurality of URIs corresponding to the plurality of input video streams selected from a plurality of candidate input streams. Additionally or alternatively, the output configuration data may include second data representing an output frame rate of the common output video. Additionally or alternatively, in some embodiments, the output configuration data may include third data representing an output resolution of the common output video. Additionally or alternatively, in some embodiments, the output configuration data may include fourth data representing a configuration of the common output video to be used.

At optional operation 904, the apparatus 200 includes means such as a hardware-accelerated video multiplexing circuitry 212, GPU(s) 210, communications circuitry 208, input/output circuitry 206, and/or processor 202, and/or a combination thereof, that configures a particular multiplexing image pipeline based at least in part on the output configuration data. For example, in some embodiments, the apparatus 200 configures the multiplexing image pipeline to generate output frame(s) of a particular size (e.g., an absolute resolution or a relative size of rows and columns). Alternatively or additionally, in some embodiments, the apparatus 200 configures the multiplexing image pipeline to generate and/or output particular output frames to a common output video at a particular output framerate.

At operation 906, the apparatus 200 includes means such as a hardware-accelerated video multiplexing circuitry 212, GPU(s) 210, communications circuitry 208, input/output circuitry 206, and/or processor 202, and/or a combination thereof, that receives a plurality of input video streams from a plurality of video input sources. In some embodiments, the plurality of video input sources are remote from the apparatus 200. The apparatus 200 may communicate directly with the video input sources to receive the input video streams directly. Alternatively or additionally, in some embodiments, the apparatus 200 communicates with an aggregator or other system that receives one or more of the input video streams from one or more video input sources for forwarding to the apparatus 200.

At operation 908, the apparatus 200 includes means such as a hardware-accelerated video multiplexing circuitry 212, GPU(s) 210, communications circuitry 208, input/output circuitry 206, and/or processor 202, and/or a combination thereof, that processes each input video stream of the plurality of input video streams via a particular multiplexing image pipeline to output processed frames to portions of an output frame. In some embodiments, the multiplexing image pipeline includes a plurality of sub-pipelines, for example a multiplexing image pipeline for processing each input video stream individually. The multiplexing image pipeline may process the data (e.g., each frame at a particular timestamp) from each input video stream into a processed frame. Additionally or alternatively, the multiplexing image pipeline may push such processed frames to a portion of an output frame. The output frame may include the image data from each frame of the plurality of input video streams associated with a particular timestamp. In some embodiments, the apparatus 200 decompresses one or more, or each, of the input video streams before, or as part of, processing such input video streams.

At operation 910, the apparatus 200 includes means such as a hardware-accelerated video multiplexing circuitry 212, GPU(s) 210, communications circuitry 208, input/output circuitry 206, and/or processor 202, and/or a combination thereof, that outputs the output frame to a common output video. In some embodiments, the apparatus 200 copies an output buffer including the output frame to the common output video. In this regard, the apparatus 200 may generate the common output video with time-synchronized image data from each of the input video streams for a plurality of timestamps. For example, the apparatus 200 generates output frames having processed frames from input video streams that all correspond to a same timestamp or range of timestamps (e.g., within 40 ms), such that the resulting common output video is sufficiently synchronized between the real-time video data at a particular moment in time. In some embodiments, the apparatus 200 outputs the output frame at a particular framerate, for example embodied by an output timer. In this regard, the apparatus 200 may utilize a presentation clock to track the output timer and output the output frame at an appropriate time.

In some embodiments, multiple output frames are processed at once for outputting. For example, in some embodiments where the apparatus 200 is configured to output a group of frames or an entirety of a stream at once, each output frame of the group is cached as it is received. Subsequently, the group of frames may be aggregated once all output frames have been processed and outputted via the hardware-accelerated video multiplexer, for example implementing the multiplexing image pipelines.

At optional operation 912, the apparatus 200 includes means such as a hardware-accelerated video multiplexing circuitry 212, GPU(s) 210, communications circuitry 208, input/output circuitry 206, and/or processor 202, and/or a combination thereof, that outputs the common output video. In some embodiments, the apparatus 200 outputs the common video output for a particular use case, for example corresponding to a particular selected output type. In some embodiments, the apparatus 200 outputs the common video output as a video stream, for example embodied as packetized image data, raw image data, and/or compressed image data Alternatively or additionally, in some embodiments, the apparatus 200 outputs the common video output to a file, for example as compressed image data or raw image data. In some embodiments, the apparatus 200 encodes the common output video utilizing a particular target video format. Alternatively or additionally, in some embodiments the apparatus 200 outputs the common output video as a default encoding associated with the one or more GPU(s), such as the GPU(s) 210, processing the data, for example H.264 and/or H.265.

FIG. 10 illustrates a flowchart including example operations for processing an output frame via a multiplexing image pipeline as part of a process for hardware-accelerated video multiplexing in accordance with at least one example embodiment of the present disclosure. Specifically, FIG. 10 depicts operations of an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one user device, display(s), client device(s), and/or the like. For purposes of simplifying the description, the process 1000 is described as performed by and from the perspective of the apparatus 200.

In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1000 is described as performed by and from the perspective of the apparatus 200.

The process 1000 beings at operation 1002. In some embodiments, the process 1000 begins after one or more operations depicted and/or described with respect to any one of the other processes described herein, for example after operation 906 as depicted and described herein. In this regard, some or all of the process 1000 may replace or supplement one or more blocks depicted and/or described with respect to any of the processes described herein. Upon completion of the process 1000, the flow of operations may terminate. Additionally or alternatively, as depicted, upon completion of the process 1000 in some embodiments, flow may return to one or more operation(s) of another process, such as the operation 910 as depicted and described herein. It will be appreciated that, in some embodiments, the process 1000 embodies a sub-process of one or more other process(es) depicted and/or described herein, for example the process 900.

At optional operation 1002, the apparatus 200 includes means such as a hardware-accelerated video multiplexing circuitry 212, GPU(s) 210, communications circuitry 208, input/output circuitry 206, and/or processor 202, and/or a combination thereof, that receives an input video stream. The input video stream may be a particular input video stream of a plurality of received input video streams. The particular input video stream may be received via a particular GPU or multiple GPU(s) operating in tandem, for example GPU(s) 210, subsequent to the apparatus 200 receiving the particular input video stream over a network. For example, in this regard the apparatus 200 may process each input video stream of the plurality of video streams via the process 1000 independently.

At operation 1004, the apparatus 200 includes means such as a hardware-accelerated video multiplexing circuitry 212, GPU(s) 210, communications circuitry 208, input/output circuitry 206, and/or processor 202, and/or a combination thereof, that parses a frame from a particular input video stream. For example, the particular input video stream may be one of the plurality of input video streams, such as that received at optional operation 1002. In some embodiments, the apparatus 200 parses the frame from the particular input video stream via one or more CPUs of the apparatus 200. The frame may be the next unparsed frame from the data embodied in the particular input video stream.

At operation 1006, the apparatus 200 includes means such as a hardware-accelerated video multiplexing circuitry 212, GPU(s) 210, communications circuitry 208, input/output circuitry 206, and/or processor 202, and/or a combination thereof, that copies the frame to at least one graphics processing unit. The apparatus 200 may copy the frame to a particular memory of the at least one GPU via at least one processor of the apparatus 200. In some embodiments, the frame embodies image data of the input video stream to be outputted via a common output video, for example after processing via one or more pipelines.

At operation 1008, the apparatus 200 includes means such as a hardware-accelerated video multiplexing circuitry 212, GPU(s) 210, communications circuitry 208, input/output circuitry 206, and/or processor 202, and/or a combination thereof, that processes, via the at least one graphics processing unit, the frame to generate a processed frame. In some embodiments, the graphics processing unit processes the frame via an executing multiplexing image pipeline. The executing multiplexing image pipeline in some embodiments parses, decodes, transforms, resizes, and/or otherwise manipulates the frame for outputting via a common output video. In some embodiments, the multiplexing image pipeline includes a particular sub-pipeline that processes the frame to generate the processed frame, for example via the steps as described herein with respect to FIG. 11.

At operation 1010, the apparatus 200 includes means such as a hardware-accelerated video multiplexing circuitry 212, GPU(s) 210, communications circuitry 208, input/output circuitry 206, and/or processor 202, and/or a combination thereof, that outputs the processed frame to a portion of an output frame. In some embodiments, the graphics processing unit outputs the processed frame via the executing multiplexing image pipeline. The executing multiplexing image pipeline in some embodiments identifies the processed frame (e.g., by retrieving the frame from an output buffer associated with the particular input video stream). The portion of the output frame may correspond to the particular input video stream, for example such that each particular input video stream corresponds to different portions of the output frame. The output frame may be maintained by a different memory of the at least one graphics processing unit than utilized for processing the frame.

FIG. 11 illustrates a flowchart including example operations for configuring an input buffer via an input pipeline as part of a process for hardware-accelerated video multiplexing in accordance with at least one example embodiment of the present disclosure. Specifically, FIG. 11 depicts operations of an example process 1100. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the apparatus 200 alone or in communication with one or more other component(s), device(s), system (s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one user device, display(s), client device(s), and/or the like. For purposes of simplifying the description, the process 1100 is described as performed by and from the perspective of the apparatus 200.

In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1100 is described as performed by and from the perspective of the apparatus 200.

The process 1100 beings at operation 1102. In some embodiments, the process 1100 begins after one or more operations depicted and/or described with respect to any one of the other processes described herein, for example after operation 906 as depicted and described herein. In this regard, some or all of the process 1100 may replace or supplement one or more blocks depicted and/or described with respect to any of the processes described herein. Upon completion of the process 1100, the flow of operations may terminate. Additionally or alternatively, as depicted, upon completion of the process 1100 in some embodiments, flow may return to one or more operation(s) of another process, such as the operation 910 as depicted and described herein. It will be appreciated that, in some embodiments, the process 1100 embodies a sub-process of one or more other process(es) depicted and/or described herein, for example the process 900. In some embodiments, the apparatus 200 performs the process 1100 at a different memory location of a GPU (or multiple GPUs) than a corresponding input pipeline, for example embodied by the process 1200 described herein.

At operation 1102, the apparatus 200 includes means such as a hardware-accelerated video multiplexing circuitry 212, GPU(s) 210, communications circuitry 208, input/output circuitry 206, and/or processor 202, and/or a combination thereof, that generates decoded frame data. In some embodiments, the apparatus 200 generates the decoded frame data by decoding a particular frame. The frame may be decoded based at least in part on an input encoding corresponding to the particular input video stream. In some embodiments, the apparatus 200 determines and/or otherwise maintains an input encoding associated with each input video stream. In this regard, the apparatus 200 may identify and/or utilize a particular decoder corresponding to the particular input encoding to decode the frame from the input video stream.

At operation 1104, the apparatus 200 includes means such as a hardware-accelerated video multiplexing circuitry 212, GPU(s) 210, communications circuitry 208, input/output circuitry 206, and/or processor 202, and/or a combination thereof, that generates resized frame data. In some embodiments, the apparatus 200 generates the resized frame data by resizing the decoded frame data to an output frame size corresponding to a particular input video stream. In some embodiments, the output frame size is determined based at least in part on a size of a particular portion of an output frame corresponding to the particular input video stream. Alternatively or additionally, in some embodiments, the apparatus 200 resizes the decoded frame data to a standardized size. For example, in some embodiments, the output frame size comprises a standardized image resolution determined by the apparatus 200. In one example context, the output frame size embodies a standardized resolution of a particular aspect ratio (e.g., 1920×1080, and/or the like).

At operation 1106, the apparatus 200 includes means such as a hardware-accelerated video multiplexing circuitry 212, GPU(s) 210, communications circuitry 208, input/output circuitry 206, and/or processor 202, and/or a combination thereof, that generates reformatted frame data. In some embodiments, the apparatus 200 generates the reformatted frame data by reformatting the resized frame data to a base format. In some embodiments, the base format embodies a standardized image format processable by the apparatus 200 and/or one or more other operating system(s). For example, in some embodiments, the apparatus 200 reformats the resized frame data into a standardized base format embodying an RGB, RGBA, HSL, HSV, or another channel-based color model.

At operation 1108, the apparatus 200 includes means such as a hardware-accelerated video multiplexing circuitry 212, GPU(s) 210, communications circuitry 208, input/output circuitry 206, and/or processor 202, and/or a combination thereof, that copies the reformatted frame data to a portion of the output frame in an output buffer. In some embodiments, each input video stream is mapped to a particular portion of the output frame. In some embodiments, each input video stream is mapped to a particular portion of the output frame based on a configuration and/or layout provided to the apparatus 200 at an earlier stage. In some embodiments, the apparatus 200 maps each input video stream to a particular portion of the output frame based at least in part on user-inputted data defining the portion of the output frame corresponding to each input video stream.

In some embodiments, the process 1100 embodies an input pipeline. The input pipeline in some embodiments is performed via a plurality of individual nodes, for example each performing a particular step or task of the process 1100. In some embodiments, the input pipeline is embodied as a sub-pipeline of a multiplexing image pipeline. The input pipeline may be utilized in conjunction with a corresponding output pipeline, as described herein, to complete the processing of a particular input video stream. In this regard, the process 1100 may be performed independently for a plurality of multiplexing image pipeline, for example each associated with a different input video stream.

FIG. 12 illustrates a flowchart including example operations for generating an output frame from an output buffer via an output pipeline as part of a process for hardware-accelerated video multiplexing in accordance with at least one example embodiment of the present disclosure. Specifically, FIG. 12 depicts operations of an example process 1200. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one user device, display(s), client device(s), and/or the like. For purposes of simplifying the description, the process 1200 is described as performed by and from the perspective of the apparatus 200.

In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1200 is described as performed by and from the perspective of the apparatus 200.

The process 1200 beings at operation 1202. In some embodiments, the process 1200 begins after one or more operations depicted and/or described with respect to any one of the other processes described herein, for example after operation 906 as depicted and described herein. In this regard, some or all of the process 1200 may replace or supplement one or more blocks depicted and/or described with respect to any of the processes described herein. Upon completion of the process 1200, the flow of operations may terminate. Additionally or alternatively, as depicted, upon completion of the process 1200 in some embodiments, flow may return to one or more operation(s) of another process, such as the operation 910 as depicted and described herein. It will be appreciated that, in some embodiments, the process 1200 embodies a sub-process of one or more other process(es) depicted and/or described herein, for example the process 900. In some embodiments, the apparatus 200 performs the process 1200 at a different memory location of a GPU (or multiple GPUs) than a corresponding input pipeline, for example embodied by the process 1100.

At operation 1202, the apparatus 200 includes means such as a hardware-accelerated video multiplexing circuitry 212, GPU(s) 210, communications circuitry 208, input/output circuitry 206, and/or processor 202, and/or a combination thereof, that copies the output buffer to an encoder. In some embodiments, the encoder embodies a particular subcomponent, embodied in hardware and/or software, of one or more graphics processing unit(s), such as the GPU(s) 210, processing the input video stream(s). The encoder may be configured to encode the data in the output buffer, for example embodying raw image data of a base format, to a particular target video format.

At operation 1204, the apparatus 200 includes means such as a hardware-accelerated video multiplexing circuitry 212, GPU(s) 210, communications circuitry 208, input/output circuitry 206, and/or processor 202, and/or a combination thereof, that generates the output frame by encoding the output buffer via the encoder. In some embodiments, the apparatus 200 encodes the output frame as part of a common output video of a particular encoding that the GPU(s) 210, for example, are configured to output. For example, in some embodiments, the apparatus 200 encodes the output frame in H.264 format. The output frame may subsequently be outputted, for example as part of the common output video.

In some embodiments, the process 1200 embodies an output pipeline. The output pipeline in some embodiments is performed via a plurality of individual nodes, for example each performing a particular step or task of the process 1200. In some embodiments, the output pipeline is embodied as a sub-pipeline of a multiplexing image pipeline. In this regard, the process 1200 may be performed independently for a plurality of multiplexing image pipeline, for example each associated with a different input video stream.

FIG. 13 illustrates a flowchart including example operations for altering a plurality of input video streams as part of a process for hardware-accelerated video multiplexing in accordance with at least one example embodiment of the present disclosure. Specifically, FIG. 13 depicts operations of an example process 1300. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the apparatus 200 alone or in communication with one or more other component(s), device(s), system (s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one user device, display(s), client device(s), and/or the like. For purposes of simplifying the description, the process 1300 is described as performed by and from the perspective of the apparatus 200.

In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1300 is described as performed by and from the perspective of the apparatus 200.

The process 1300 beings at operation 1302. In some embodiments, the process 1300 begins after one or more operations depicted and/or described with respect to any one of the other processes described herein, for example during or after any of the operations of the process 900 as depicted and described herein. In this regard, some or all of the process 1300 may replace or supplement one or more blocks depicted and/or described with respect to any of the processes described herein. Upon completion of the process 1300, the flow of operations may terminate. Additionally or alternatively, as depicted, upon completion of the process 1300 in some embodiments, flow may return to one or more operation(s) of another process, such as the next operation in the process. It will be appreciated that, in some embodiments, the process 1300 embodies a sub-process of one or more other process(es) depicted and/or described herein, for example the process 900.

At operation 1302, the apparatus 200 includes means such as a hardware-accelerated video multiplexing circuitry 212, GPU(s) 210, communications circuitry 208, input/output circuitry 206, and/or processor 202, and/or a combination thereof, that receives an inputs modification request. The inputs modification request indicates a requested alteration to a plurality of input video streams to be processed as described herein. For example, in some embodiments, the requests modification request indicates a request to add a new input video stream to the plurality of input video streams for outputting to a common video output. Alternatively or additionally, in some embodiments the requests modification request indicates a request to replace an existing input video stream selected from the plurality of input video streams with a replacement video stream. The replacement video stream may embody a particular video stream from a set of candidate input video streams that the apparatus 200 is configured to receive, but is not currently receiving as part of outputting a particular common output video. For example, a user may select an initial set of input video streams to view from a set of candidate input video streams, and subsequently initiate an inputs modification request to replace one of the original input video streams with a replacement video stream that was not previously selected in a circumstance where the replacement video stream becomes important to view. Additionally or alternatively still, in some embodiments the inputs modification request indicates a request to remove a selected input video stream from the plurality of input video streams.

In some embodiments, the inputs modification request is received in response to user interaction. For example, a user may interact with the apparatus 200 or a corresponding user device to generate and/or transmit the inputs modification request. Such user interaction may indicate the particular input video streams to be added, replaced, and/or removed, for example.

Alternatively or additionally, in some embodiments the apparatus 200 receives the inputs modification request automatically generated via the apparatus 200 itself or a corresponding data-driven system or application. For example, in some embodiments, the apparatus 200 performs a data-driven determination to select a particular plurality of input video streams to be processed from a set of candidate input video streams. A subsequent data-driven determination performed by the apparatus 200 may subsequently identify a second plurality of input video streams to be processed from the set of candidate input video streams, which may differ from the earlier-identified plurality. In this regard, the apparatus 200 in some embodiments generates one or more inputs modification request(s) to automatically adjust from processing the previously-identified plurality of input video streams to the second plurality of input video streams. Such processing may be performed continuously, such that the apparatus 200 continues to automatically update the plurality of input video streams being processed as needed. In one example context, for example, the apparatus 200 adjusts a plurality of input video streams to represent all input video streams of a candidate set within which motion was detected, a change was detected, or another video-analytics-derived event was triggered, or where one or more other data-driven alert(s) was triggered.

In some embodiments, the apparatus 200 automatically adjusts the plurality of input video streams being processed based on one or more data-driven alert(s) received and/or tracked by the apparatus 200. For example, the apparatus 200 may track data-driven alert(s) received for each input video stream, where a data-driven alert indicates an occurrence of an event requiring displaying of the input video stream. In this regard, the apparatus 200 may continually generate and/or otherwise receive inputs modification request(s) to alter a current plurality of input video streams being processed to reflect a certain number of input video streams associated with the most received alerts, the input video streams associated with alert(s) received in a particular historical timestamp interval (e.g., within the last minute, hour, day, and/or the like), and/or the like. In this regard, it will be appreciated that the apparatus 200 may receive the inputs modification request(s) to dynamically update the input video streams being processed to output a common output video in real-time as the system, or an associated system, functions.

At operation 1304, the apparatus 200 includes means such as a hardware-accelerated video multiplexing circuitry 212, GPU(s) 210, communications circuitry 208, input/output circuitry 206, and/or processor 202, and/or a combination thereof, that alters the plurality of input video streams in accordance with the inputs modification request. For example, in some embodiments the apparatus 200 ceases communication with a socket or other input mechanism for receiving removed and/or replaced input video stream(s), and/or initiates socket(s) and/or other input mechanism(s) for added and/or replacement input video stream(s). In this regard, once the plurality of input video streams is altered, it should be appreciated that the apparatus 200 may subsequently generate and/or output common output videos based at least in part on data for the plurality of input video streams updated in accordance with the inputs modification request.

CONCLUSION

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for hardware-accelerated video multiplexing, the apparatus comprising:
   at least one graphics processing unit; and
   at least one processor and at least one non-transitory memory including computer-coded instructions thereon, the computer coded instructions, with the at least one processor, cause the apparatus to:
   receive a plurality of input video streams from a plurality of video input sources;
   process each input video stream of the plurality of input video streams via the at least one graphics processing unit, each input video stream associated with a particular multiplexing image pipeline of a plurality of multiplexing image pipelines, wherein each multiplexing image pipeline is executed via the at least one graphical processing unit and is configured to:
   parse a frame from the particular input video stream;
   copy the frame to the at least one graphics processing unit;
   process, via the particular multiplexing image pipeline executed by the at least one graphics processing unit, the frame to generate a processed frame, wherein the processing of the frame includes:
   generating decoded frame data by decoding the frame based at least in part on an input encoding corresponding to the particular input video stream;
   generating resized frame data by resizing the decoded frame data to an output frame size corresponding to the particular input video stream;
   generating reformatted frame data by reformatting the resized frame data to a base format; and
   copying the reformatted frame data to the portion of the output frame in an output buffer; and
   output, via the at least one graphics processing unit, the processed frame to a portion of an output frame, the portion of the output frame corresponding to the particular input video stream; and
   output, via the at least one graphics processing unit, the output frame to a common output video representing a transmissible stream of data or a data file.

2. The apparatus of claim 1, wherein to output each output frame to the common output video, the apparatus is configured to:
   write, via the at least one graphics processing unit, the output frame to a file comprising the common output video.

3. The apparatus of claim 1, wherein to output each output frame to a single output video, the apparatus is configured to:
   generate, via the at least one graphics processing unit, a packet comprising at least a portion of the common output video.

4. The apparatus of claim 1, wherein the output frame comprises a grid comprising a plurality of rows and a plurality of columns, wherein the portion of the output frame corresponding to the particular input video stream comprises a defined range of rows and columns in the grid.

5. The apparatus of claim 1, the at least one graphics processing unit further caused to receive output configuration data comprising:
   first data representing a plurality of URIs corresponding to the plurality of input video streams selected from a plurality of candidate input streams,
   second data representing an output frame rate of the common output video,
   third data representing an output resolution of the common output video, and/or
   fourth data representing a configuration of the common output video.

6. The apparatus of claim 1, wherein the plurality of input video streams comprises a plurality of prerecorded video data, and wherein the at least one graphics processing unit is configured to output the output frame to the common output video at a first framerate that is faster than a second framerate, the second framerate comprising a playback framerate of the common output.

7. The apparatus of claim 1, wherein the base format comprises an RGBa format.

8. The apparatus of claim 1, wherein the multiplexing image pipeline comprises an output pipeline configured to copy the output buffer to an encoder; and
generate the output frame by encoding the output buffer via the encoder.

9. The apparatus of claim 1, the apparatus further caused to:
output the common output video to a plurality of client devices.

10. The apparatus of claim 1, wherein the processed frame comprises an image primitive, the apparatus further caused to:
receive an indication of a selected output type; and
output the common output video based at least in part on the selected output type.

11. The apparatus of claim 1, the apparatus further caused to:
receive an inputs modification request to remove a selected input stream from the plurality of input video streams, replace the selected stream from the plurality of input video streams with a replacement input stream, or add a new input stream to the plurality of input video streams; and
alter the plurality of input video streams based at least in accordance with the inputs modification request.

12. The apparatus of claim 1, wherein at least a first multiplexing image pipeline of the plurality of multiplexing image pipelines is associated with a first framerate and a second multiplexing image pipeline of the plurality of multiplexing image pipelines is associated with a second framerate, and wherein to output the output frame the apparatus is caused to:
synchronize a plurality of portions of the output frame based at least in part on a synchronization frame rate.

13. The apparatus of claim 1, the apparatus further caused to:
encode the common video output to a target video format.

14. The apparatus of claim 1, wherein the output frame comprises compressed image data, raw image data, or packetized image data.

15. The apparatus of claim 1, the apparatus further caused to:
decompress each input video stream of the plurality of video streams before processing.

16. The apparatus of claim 1, wherein the common output video represents one selected from:
the transmissible stream of data communicable in real-time to an external video wall;
the transmissible stream of data communicable in real-time to an external client device;
the transmissible stream of data communicable in real-time to at least one local display;
the data file storable to a local storage; or
the data file playable via a local rendering server.

17. The apparatus of claim 1, the apparatus further caused to:
receive at least one data-driven alert associated with the plurality of input video streams; and
adjust at least one input video stream of the plurality of input video streams based at least in part on the at least one data-driven alert, wherein the at least one data-driven alert indicates an occurrence of an event requiring a display of the at least one input video stream.

18. A computer-implemented method comprising:
receiving, at a system comprising at least one graphics processing unit, a plurality of input video streams from a plurality of video input sources;
processing each input video stream of the plurality of input video streams via the at least one graphics processing unit, each input video stream processed using a particular multiplexing image pipeline of a plurality of multiplexing image pipelines, wherein each multiplexing image pipeline is executed via the at least one graphical processing unit and is configured for:
parsing, a frame from the particular input video stream;
copying, the frame to the at least one graphics processing unit;
processing, via the particular multiplexing image pipeline, the frame to generate a processed frame, wherein the processing of the frame includes:
generating decoded frame data by decoding the frame based at least in part on an input encoding corresponding to the particular input video stream;
generating resized frame data by resizing the decoded frame data to an output frame size corresponding to the particular input video stream;
generating reformatted frame data by reformatting the resized frame data to a base format; and
copying the reformatted frame data to the portion of the output frame in an output buffer; and
outputting, via the at least one graphics processing unit, the processed frame to a portion of an output frame, the portion of the output frame corresponding to the particular input video stream; and
outputting, via the at least one graphics processing unit, the output frame to a common output video.

19. A computer program product comprising at least one non-transitory computer-readable storage medium having computer program code stored thereon that, in execution with at least one processor, configures the at least one processor for:
receiving a plurality of input video streams from a plurality of video input sources;
processing each input video stream of the plurality of input video streams via at least one graphics processing unit, each input video stream processed using a particular multiplexing image pipeline of a plurality of multiplexing image pipelines, wherein each multiplexing image pipeline is executed via the at least one graphical processing unit and is configured for:
parsing, a frame from the particular input video stream;
copying, the frame to the at least one graphics processing unit;
processing, via the particular multiplexing image pipeline, the frame to generate a processed frame, wherein the processing of the frame includes:
generating decoded frame data by decoding the frame based at least in part on an input encoding corresponding to the particular input video stream;
generating resized frame data by resizing the decoded frame data to an output frame size corresponding to the particular input video stream;
generating reformatted frame data by reformatting the resized frame data to a base format; and
copying the reformatted frame data to the portion of the output frame in an output buffer; and
outputting, via the at least one graphics processing unit, the processed frame to a portion of an output frame, the portion of the output frame corresponding to the particular input video stream; and outputting, via the at least one graphics processing unit, the output frame to a common output video.

\* \* \* \* \*